United States Patent
Kambe et al.

(10) Patent No.: US 6,168,843 B1
(45) Date of Patent: Jan. 2, 2001

(54) OPTICAL RECORDING MEDIUM

(75) Inventors: Emiko Kambe; Masahiro Shinkai, both of Chiba; Sumiko Kitagawa, Saitama; Atsushi Monden, Chiba, all of (JP)

(73) Assignee: TDK Corporation, Tokyo (JP)

( * ) Notice: Under 35 U.S.C. 154(b), the term of this patent shall be extended for 0 days.

(21) Appl. No.: 09/117,621

(22) PCT Filed: Dec. 22, 1997

(86) PCT No.: PCT/JP97/04735

§ 371 Date: Feb. 16, 1999

§ 102(e) Date: Feb. 16, 1999

(87) PCT Pub. No.: WO98/29257

PCT Pub. Date: Jul. 9, 1998

(30) Foreign Application Priority Data

Dec. 27, 1996 (JP) .................................................. 8-357891
Mar. 31, 1997 (JP) .................................................. 9-096735

(51) Int. Cl.$^7$ ............................................................. B32B 3/00
(52) U.S. Cl. .................. 428/64.1; 428/64.4; 428/64.8; 428/913; 430/270.14; 430/270.16; 430/270.19; 430/945; 369/283; 369/288
(58) Field of Search ................................. 428/64.1, 64.2, 428/64.4, 64.8, 913; 430/270.14, 270.16, 270.19, 270.21, 495.1, 945; 369/283, 288

(56) References Cited

U.S. PATENT DOCUMENTS 5,633,106 * 5/1997 Aihara et al. ............................ 430/21
5,939,163 * 8/1999 Ueno et al. ............................ 428/64.1

FOREIGN PATENT DOCUMENTS 2-55189   2/1990 (JP) .
3-51182   3/1991 (JP) .
5-24360   7/1991 (JP) .
WO 91/18950 12/1991 (JP) .
63-81165  4/1995 (JP) .

OTHER PUBLICATIONS

EPO Search Report: 97949192.5 –Dated Mar. 2, 2000.

* cited by examiner

*Primary Examiner*—Elizabeth Evans
(74) *Attorney, Agent, or Firm*—Laubscher & Laubscher; R. J. Lasker, Esq.

(57) ABSTRACT

An optical recording medium is provided in which a recording layer contains a salt-forming dye between an ion of an azo metal complex of the following formula (I) and an ion of a cyanine dye of the following formula (II), having a complex index of refraction in the wavelength region of recording light and/or reading light whose imaginary part k is up to 0.20, or at least one of azo oxovanadium metal complexes having an azo compound of the following formula (III) as a ligand and metal complexes having azo compounds of the following formulae (IV) and (V) as a ligand. Recording and reading can be carried out at a conventional wavelength or a short wavelength of about 630–690 nm or both.

(I)

(II)

(III)

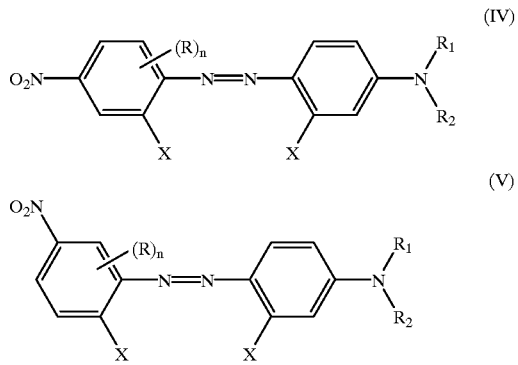

In formulae (I) and (III), A is an aromatic ring group having an active hydrogen-bearing group at a position adjacent to the diazo group or a nitrogenous heteroaromatic ring group having an oxovanadium-coordinatable nitrogen atom at a position adjacent to the carbon atom in the ring attached to the diazo group, and B is an aromatic ring group having an active hydrogen-bearing group at a position adjacent to the diazo group. In formula (I), m is equal to 1 or 2, and $M_1$ is a center metal.

In formula (II), $Q^1$ and $Q^2$ each are a group of atoms forming a 5-membered nitrogenous heterocyclic ring which may have a fused ring, L is a methine chain, $R^1$ and $R^2$ each are an alkyl group.

In formulae (IV) and (V), X is an active hydrogen-bearing group, $R^1$ and $R^2$ each are an alkyl group, the total number of carbon atoms in $R^1$ and $R^2$ is from 2 to 8, R is a nitro group, and n is equal to 0 or 1.

15 Claims, 2 Drawing Sheets

OPTICAL RECORDING MEDIUM

TECHNICAL FIELD

This invention relates to an optical recording medium and more particularly, to a highly light resistant optical recording medium capable of writing and reading with a near-infrared laser of 770 to 830 nm, an optical recording medium capable of writing and reading with a red laser of 630 to 690 nm, or an optical recording medium capable of writing and reading with a near-infrared laser of 770 to 830 nm and a red laser of 630 to 690 nm.

BACKGROUND ART

The present inventors have been engaged in the development of write-once type compact discs (CD-R) as a recordable optical recording medium corresponding to the compact disc (CD) standard.

As the dye for the CD-R's, cyanine dyes have been widely employed because of their solubility and wavelength characteristics. The cyanine dyes, however, have the drawback of poor light resistance or fastness. As a solution to this problem, attempts have been made to add quenchers and to form salts with Ni and Cu dithiolene metal complexes. These methods leave the problems that light resistance is not fully improved and productivity is low on account of poor solubility.

Under such circumstances, JP-B 37580/1995 proposes an optical recording medium comprising a chromium-containing azo compound. This medium, however, is insufficient in light resistance. JP-B 37580/1995 also discloses an optical recording medium comprising a cyanine dye and an azo metal chelate compound of an azo compound with a metal. Further, JP-A 55189/1990 discloses an optical recording medium comprising a recording layer composed of a cyanine dye and a diol hexa-coordinate metal complex salt compound of naphthalenino-azobenzene. Mixtures of a cyanine dye and an azo metal compound as used in these examples provide insufficient light resistance. Also, JP-A 51182/1991 discloses an optical recording medium comprising on a transparent substrate a recording layer containing a photo-stabilized organic dye in the form of a bonded compound of an anion of an electron-accepting azo metal complex salt compound with a cation of a cyanine dye having absorption in the wavelength region of recording light. However, neither the cyanine dye cation nor the compound bonded therewith is specified therein, and the desired characteristics are not obtained when certain cyanine dye cations are combined. The only exception is FIG. 2 showing the absorption spectrum of a recording layer. But we confirmed that no satisfactory characteristics were obtained when such a dye was applied to CD-R.

Higher density optical recording media are desired in the recent years. Exemplary media are CD-R of the next generation wherein the recording wavelength of CD-R is reduced from the current 780 nm to a shorter wavelength of 680 nm to 635 nm and write-once type digital video discs (DVD-R) capable of recording and reading at 650 nm. With the interchangeability with the existing CD-R taken into account, CD-RII capable of reading at a short wavelength too has been proposed. The requirements on the dyes used in these standards are considered substantially equal to those on the currently used dyes except the wavelength. However, since development works have hitherto been made so as to match with 780 nm, there are known few dyes which can satisfy desired characteristics including light resistance, solubility and recording sensitivity on the shorter wavelength side of 680 nm to 635 nm.

For use in recording layers of optical recording media adapted to record signals at a laser wavelength of 680 nm to 635 nm, mention may be made of cyanine dyes, which undergo substantial photo-degradation and lack stability. Dyes having higher light resistance include metal azo complexes as described in JP-B 51682/1995, JP-A 268994/1991, and JP-A 156408/1996, for example. Despite high light resistance, these dyes have the problems of low recording sensitivity and low solubility, and that when used in optical recording media, the dyes fail to afford a good balance between Rtop and modulation among disc characteristics on account of a broader half band width of their absorption spectrum.

DISCLOSURE OF THE INVENTION

A primary object of the invention is to provide an optical recording medium which has improved light resistance and a sufficient solubility in coating solvents which do no attack polycarbonate substrates, especially fluorinated alcohol solvents and cellosolve solvents capable of improving a tact time, and exhibits excellent recording/reading characteristics complying with the CD standard to light having a wavelength selected from the range of 770 nm to 830 nm, especially a wavelength of 780 nm. A second object is to provide an optical recording medium which has improved light resistance and exhibits excellent recording/reading characteristics at a wavelength selected from the range of 630 nm to 690 nm, especially 635 nm to 680 nm; and a third object is to provide an optical recording medium which, in addition to the above advantages, exhibits excellent recording characteristics sufficient to enable recording and reading in accordance with the CD standard, with light having a conventional wavelength selected from the range of 770 nm to 830 nm, especially a wavelength of 780 nm.

This and other objects are achieved by the present invention which is defined below as (1) to (17).

(1) An optical recording medium comprising a recording layer containing a salt-forming dye between an ion of an azo metal complex of the following formula (I) and an ion of a cyanine dye of the following formula (II), the salt-forming dye having a complex index of refraction in the wavelength region of recording light and/or reading light whose imaginary part k is up to 0.20;

(I)

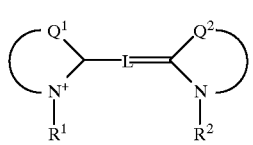

(II)

wherein in formula (I), A is an aromatic ring group having an active hydrogen-bearing group at a position adjacent to the diazo group or a nitrogenous heteroaromatic ring group having therein a metal ion-coordinatable nitrogen atom at a position adjacent to the carbon atom in the ring attached to the diazo group; B is an aromatic ring group having an active hydrogen-bearing group at a position adjacent to the diazo group; m is equal to 1 or 2; and $M_1$ is a center metal, with formula (I) schematically illustrating the coordination of A—N=N—B thereto;

in formula (II), $Q^1$ and $Q^2$ each are a group of atoms forming a 5-membered nitrogenous heterocyclic ring which may have a fused ring; L is a methine chain; $R^1$ and $R^2$ each are an alkyl group.

(2) The optical recording medium of (1) wherein in formula (II), the nitrogenous heterocyclic ring completed by $Q^1$ or $Q^2$ which may have a fused ring is an indolenine ring, thiazoline ring or oxazoline ring, and L is trimethine or pentamethine.

(3) The optical recording medium of (1) or (2) wherein the ion of cyanine dye of formula (II) is an ion of an indolenine type cyanine dye.

(4) The optical recording medium of any one of (1) to (3) wherein the center metal represented by $M_1$ in formula (I) is vanadium, cobalt, nickel or copper.

(5) An optical recording medium comprising a recording layer containing an azo oxovanadium metal complex between an azo compound of the following formula (III) and oxovanadium;

wherein A is an aromatic ring group having an active hydrogen-bearing group at a position adjacent to the diazo group or a nitrogenous heteroaromatic ring group having therein an oxovanadium-coordinatable nitrogen atom at a position adjacent to the carbon atom in the ring attached to the diazo group; and B is an aromatic ring group having an active hydrogen-bearing group at a position adjacent to the diazo group.

(6) The optical recording medium of (5) wherein A in formula (III) is an aromatic ring group having an active hydrogen-bearing group at a position adjacent to the diazo group.

(7) An optical recording medium comprising a recording layer containing an azo metal complex obtained by combining at least one of an azo compound of the following formula (IV) and a compound of the following formula (V) with a metal compound;

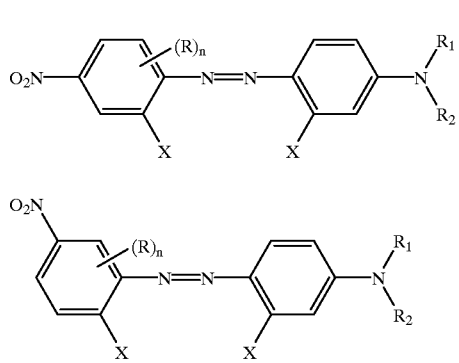

wherein X is an active hydrogen-bearing group, $R^1$ and $R^2$ each are an alkyl group, the total number of carbon atoms in $R^1$ and $R^2$ is from 2 to 8, R is a nitro group, and n is equal to 0 or 1.

(8) The optical recording medium of (7) wherein said azo metal complex is a metal complex with oxovanadium or cobalt.

(9) The optical recording medium of (7) or (8) wherein said azo metal complex is a metal complex of the compound of formula (V) with oxovanadium or cobalt.

(10) The optical recording medium of any one of (5) to (9) wherein said recording layer contains a second light-absorbing dye having different optical properties from said azo metal complex, and recording/reading operation is carried out with light having a first wavelength of 630 to 690 nm and light having a second wavelength of 770 to 830 nm.

(11) The optical recording medium of (10) wherein recording is carried out with light having the second wavelength and reading is carried out with light having the first and second wavelengths.

(12) The optical recording medium of (10) wherein said recording layer is disposed on a substrate, in which said azo metal complex has a complex index of refraction at 650 nm whose real part n is 1.8 to 2.6 and whose imaginary part k is 0.02 to 0.20, and said second light-absorbing dye has a complex index of refraction at 780 nm whose real part n is 1.8 to 2.6 and whose imaginary part k is 0.02 to 0.30 and forms a thin film whose absorption spectrum has a half band width of up to 170 nm.

(13) The optical recording medium of any one of (5) to (9) wherein the recording layer is constructed of at least two layers by laying on a first recording layer containing said azo metal complex a second recording layer containing a second light-absorbing dye having different optical properties from said azo metal complex.

(14) The optical recording medium of (13) wherein said azo metal complex has a complex index of refraction at 650 nm whose real part n is 1.8 to 2.6 and whose imaginary part k is 0.02 to 0.20, and said second light-absorbing dye has a complex index of refraction at 780 nm whose real part n is 1.8 to 2.6 and whose imaginary part k is 0.02 to 0.15 and forms a thin film whose absorption spectrum has a half band width of up to 170 nm, and the recording layer constructed of at least two layers is disposed on a substrate.

(15) The optical recording medium of (13) or (14) wherein the first recording layer is disposed on the substrate, and the second recording layer is disposed on the first recording layer.

(16) The optical recording medium of any one of (10) to (15) wherein said second light-absorbing dye is a phthalocyanine dye of the following formula (VI):

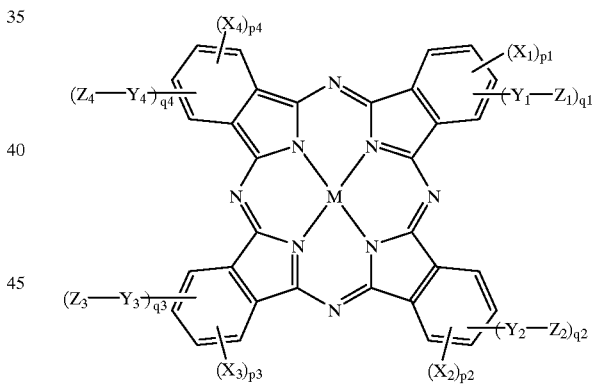

wherein M is a center atom; $X_1$, $X_2$, $X_3$, and $X_4$, which may be the same or different, are halogen atoms; p1, p2, p3, and p4 are 0 or integers of 1 to 4, p1+p2+p3+p4 is equal to 0 to 15; $Y_1$, $Y_2$, $Y_3$, and $Y_4$, which may be the same or different, are oxygen atoms or sulfur atoms; $Z_1$, $Z_2$, $Z_3$, and $Z_4$, which may be the same or different, are alkyl groups having at least 4 carbon atoms, alicyclic hydrocarbon groups, aromatic hydrocarbon groups or heterocyclic groups; q1, q2, q3, and q4 are 0 or integers of 1 to 4, they are not equal to 0 at the same time, and q1+q2+q3+q4 is equal to 1 to 8.

(17) The optical recording medium of (15) or (16) wherein said first recording layer and said second recording layer each have a thickness of 20 to 250 nm, and the thickness of said first recording layer divided by the thickness of said second recording layer is from 0.1 to 1.

It is noted that JP-A 51182/1991 discloses an optical recording medium comprising on a transparent substrate a recording layer containing a photo-stabilized organic dye in the form of a bonded compound of an anion of an electron-accepting azo metal complex salt compound with a cation of a cyanine dye having absorption in the wavelength region of recording light. However, this patent lacks the description specifying the cyanine dyes or the compounds bonded therewith, and refers nowhere the imaginary part k of the complex index of refraction of the bonded compounds.

JP-A 156408/1996 discloses an optical recording medium comprising a recording layer containing a metal complex of an azo compound and a dye having substantial absorption at 720 to 850 nm, and describes that it is capable of recording and reading with light of 780 nm and also capable of reading or recording and reading with light of 620 to 690 nm.

Although the azo compounds disclosed therein are encompassed within the azo compounds of formula (III) according to the present invention, the center metals of the metal complexes are Ni, Co, Pd, etc. No reference is made to oxovanadium (VO) according to the present invention.

Also, the azo compounds disclosed therein have a nitrogenous heterocyclic ring as one of the rings connected through the diazo group, and their structure is apparently different from formulae (IV) and (V) defined in the present invention.

BEST MODE FOR CARRYING OUT THE INVENTION

Figure 1:
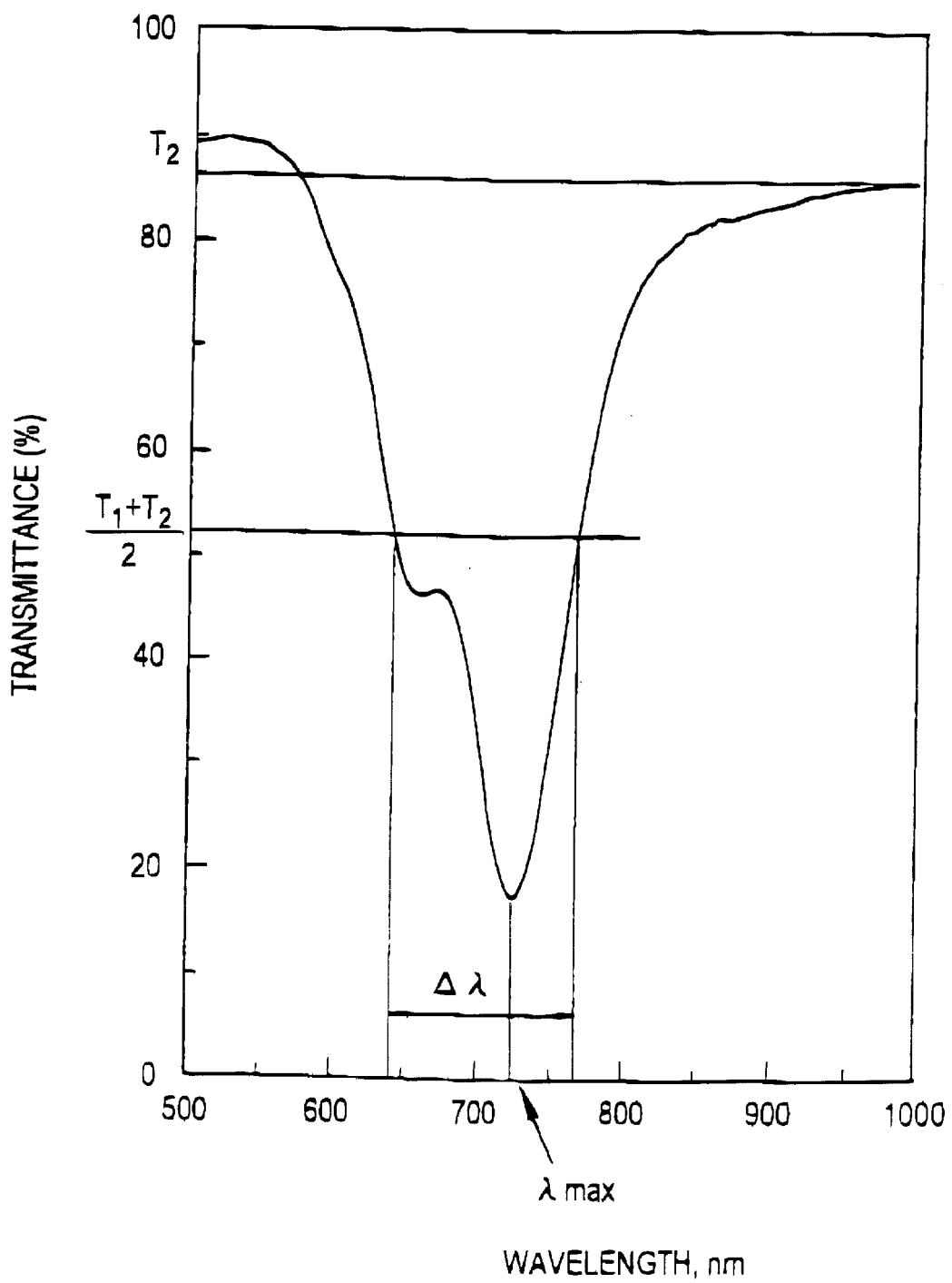
FIG. 1 is a graph illustrating how to determine a half band width from an absorption spectrum of a thin film of phthalocyanine dye.

Now the present invention is described in detail.

The optical recording medium of the invention has a recording layer which contains an azo family metal complex compound. The azo family metal complex compound is a salt-forming dye between an ion of an azo metal complex of formula (I) and an ion of a cyanine dye of formula (II), an azo oxovanadium metal complex of an azo compound of formula (III) with oxovanadium, or an azo metal complex obtained by reacting at least one of azo compounds of formulae (IV) and (V) with a metal compound.

The salt-forming dye is used, mainly by virtue of a choice of the cyanine dye skeleton, for the purpose of recording and/or reading in the short wavelength region of 630 to 690 nm or for the purpose of recording and/or reading in the conventional wavelength region of 770 to 830 nm. The azo oxovanadium metal complex and the azo metal complex are used for the purpose of recording and/or reading in the short wavelength region of 630 to 690 nm.

First of all, the salt-forming dye is described.

The salt-forming dye has a complex index of refraction in the wavelength region of recording light and/or reading light whose imaginary part k is up to 0.20, preferably 0 to 0.20, and more preferably 0.01 to 0.20. By restricting k in this range, the dye is given a sufficient reflectance to ensure effective recording and reading. In contrast, if k exceeds 0.20, the reflectance becomes insufficient. Herein, the real part n of the complex index of refraction is preferably at least 1.8, and more preferably 1.8 to 2.6. A smaller value of n would lead to less modulation of signals.

It is noted that n and k of the salt-forming dye are determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance in the wavelength region of recording light and/or reading light, and calculating n and k from these measurements according to ISHIGURO Kozo, "Optics," Kyoritsu Publishing K.K., pages 168–178, for example. The reflectance is a reflectance of the test sample through the substrate or a reflectance of the sample from the dye film side while it is measured in a specular reflection mode (of the order of 5°). The measurement wavelength is generally selected herein from the wavelength region of 635 nm, 650 nm and 780 nm.

Formula (I) is first described. In formula (I), A—N=N—B is illustrated as being coordinated although description is herein made on the compound prior to coordination. A is an aromatic ring group having an active hydrogen-bearing group or a nitrogenous heteroaromatic ring group having therein a nitrogen atom coordinatable to a metal ion, and B is an aromatic ring group having an active hydrogen-bearing group.

In the aromatic ring group having an active hydrogen-bearing group, represented by A, the aromatic ring may be either carbocyclic or heterocyclic and either monocyclic or polycyclic as in fused poly-rings and a ring cluster. Exemplary aromatic rings include benzene, naphthalene, pyridine, thiazole, benzthiazole, oxazole, benzoxazole, quinoline, imidazole, pyrazine, and pyrrole rings, with the benzene ring being especially preferred.

The active hydrogen-bearing group is attached to the aromatic ring at a position adjacent to the diazo group. Examples of the active hydrogen-bearing group include —OH, —SH, —NH$_2$, —COOH, —CONH$_2$, —SO$_2$NH$_2$, and —SO$_3$H, with —OH being especially preferred.

In addition to the active hydrogen-bearing group and the azo group, the aromatic ring may further have a substituent, examples of which include nitro groups, halogen atoms (e.g., chlorine and bromine atoms), carboxyl groups, sulfo groups, sulfamoyl groups, and alkyl groups (preferably having 1 to 4 carbon atoms, such as methyl). Of these, nitro groups and halogen atoms are preferred, with the nitro groups being especially preferred. The nitro group is preferably attached at the meta- or para-position relative to the diazo group. In general, the meta-position is preferred when the recording/reading light is in the short wavelength region of 630 to 690 nm whereas the para-position is preferred when the recording/reading light is in the conventional wavelength region of 770 to 830 nm. Two or more substituents may be present, and they may be the same or different.

In the nitrogenous heteroaromatic ring group having therein a nitrogen atom coordinatable to a metal ion, represented by A, the nitrogenous heteroaromatic ring may be either monocyclic or fused polycyclic. Examples of the nitrogenous heteroaromatic ring include pyridine, thiazole, benzthiazole, oxazole, benzoxazole, quinoline, imidazole, pyrazine, and pyrrole rings, with the pyridine and thiazole rings being especially preferred.

The position of the nitrogen atom in the ring is adjacent to the carbon atom to which the azo group is attached.

In addition to the azo group, the nitrogenous heteroaromatic ring may further have a substituent, examples of which include halogen atoms (e.g., chlorine and bromine atoms) and alkyl groups (preferably having 1 to 4 carbon atoms, such as methyl).

A is preferably a benzene ring, especially a benzene ring having a nitro group as a substituent.

In the aromatic ring group having an active hydrogen-bearing group, represented by B, the aromatic ring is the same as described for A, with the position of attachment of the active hydrogen-bearing group being also the same. Imidazole, benzene, and naphthalene rings are preferred among others. The benzene and naphthalene rings are more preferred, with the benzene ring being especially preferred.

The active hydrogen-bearing group is the same as described for A, with its preferred examples being also the same.

In addition to the active hydrogen-bearing group and the azo group, the aromatic ring may further have a substituent, examples of which include amino groups (which may be unsubstituted amino groups, but are preferably dialkylamino groups, more preferably dialkylamino groups having 2 to 8 carbon atoms in total, for example, dimethylamino, diethylamino, methylethylamino, methylpropylamino, dibutylamino, and hydroxyethylmethylamino groups);

alkoxy groups (in which the alkyl moiety preferably has 1 to 4 carbon atoms, for example, methoxy);

alkyl groups (preferably having 1 to 4 carbon atoms, for example, methyl);

aryl groups (preferably monocyclic, for example, phenyl and o-, m- and p-chlorophenyl groups);

carboxyl groups; and sulfo groups.

B preferably represents a benzene or naphthalene ring, and especially a benzene ring having a dialkylamino group substituted.

The center metal $M_1$ is selected from transition metals and other metals, with Co, Mn, Ti, V, Ni, Cu, Zn, Mo, W, Ru, Fe, Pd, Pt, and Al being preferred. Among these, V, Mo and W may take the form of an oxide ion, for example, $VO^{2+}$, $VO^{3+}$, $MoO_2^+$, $MoO^{3+}$, and $WO^{3+}$. Further preferable examples of the center metals (inclusive of oxide ions) are oxovanadium (VO) such as $VO^{2+}$ and $VO^{3+}$, Co, Ni, and Cu.

Letter m is equal to 1 or 2 while the azo metal complex of formula (I) becomes an anion or cation. Where m is equal to 2, the ligands A—N=N—B may be the same or different.

It is noted that in formula (I), the active hydrogen-bearing group in A—N=N—B coordinates to the center metal in the form of an acid anion (—O⁻ where the active hydrogen-bearing group is —OH).

The compound A—N=N—B serving as a ligand is as defined for formula (III) to be described later, and its preferred examples are the same as the compounds of formulae (IV) and (V)

Next, the ion of cyanine dye of formula (II) which is a counterion to the ion of azo metal complex of formula (I) is described.

In formula (II), each of $Q^1$ and $Q^2$, which may be the same or different, is a group of atoms forming a 5-membered nitrogenous heterocyclic ring which may have a fused ring. Exemplary heterocyclic rings are indolenine, 4,5-benzoindolenine, oxazoline, thiazoline, selenazoline, and imidazoline rings. Preferred examples are indolenine, 4,5-benzoindolenine, oxazoline, and thiazoline rings, with the indolenine and 4,5-benzoindolenine rings being especially preferred. Preferred combinations of $Q^1$ and $Q^2$ are a combination of indolenine rings, a combination of 4,5-benzoindolenine rings, and a combination of an indolenine ring and a 4,5-benzoindolenine ring.

These rings may have substituents, examples of which include halogen atoms, alkyl groups, alkoxy groups, aryl groups, acyl groups, and amino groups (such as alkylamino groups).

$R^1$ and $R^2$ are alkyl groups. The alkyl groups, which may have substituents, are preferably those of 1 to 5 carbon atoms, for example, methyl, ethyl, propyl and butyl groups. Exemplary substituents are halogen atoms, alkyl groups, aryl groups, ether groups such as alkoxy groups, ester groups, heterocyclic groups, and sulfonato groups. The alkyl groups represented by $R^1$ and $R^2$ include methyl, ethyl, n-, i-, s- and t-butyl, methoxymethyl, methoxyethyl, ethoxyethyl, sulfonato, methyl, sulfonatoethyl, sulfonatopropyl, and sulfonatobutyl.

L is a methine chain, preferably trimethine or pentamethine, which may have a substituent such as methyl. In general, trimethine is preferred when the recording/reading light is in the short wavelength region of 630 to 690 nm whereas pentamethine is preferred when the recording/reading light is in the conventional wavelength region of 770 to 830 nm.

Of the ions of cyanine dyes of formula (II), ions of indolenine, benzothiazoline and benzoxazoline cyanine dyes are preferred, with the ions of indolenine cyanine dyes being especially preferred.

Especially preferred are indolenine cyanine dyes of the following formulae (IIa), (IIb) and (IIc).

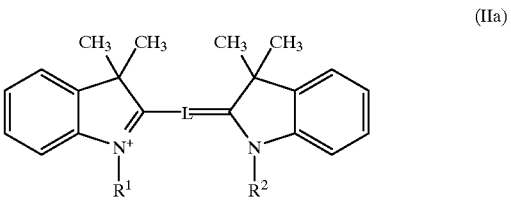

(IIa)

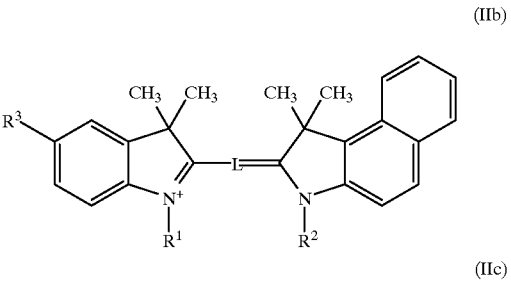

(IIb)

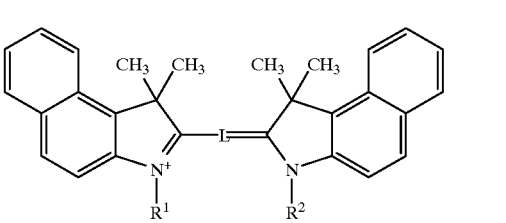

(IIc)

In formulae (IIa) to (IIc), $R^1$, $R^2$, and L are as defined in formula (II). $R^3$ is a hydrogen atom or as defined for the substituent in the ring completed by $Q^1$ and $Q^2$. Preferred examples of $R^3$ are hydrogen atoms, halogen atoms, alkyl groups and alkoxy groups, with hydrogen atoms, chlorine atoms, methyl groups and methoxy groups being especially preferred.

Illustrative, non-limiting, examples of the ions of these cyanine dyes are given below.

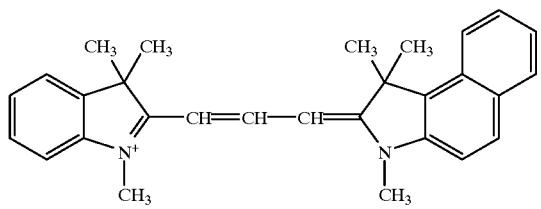
B-1
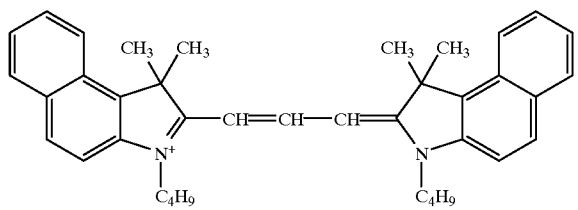
B-2
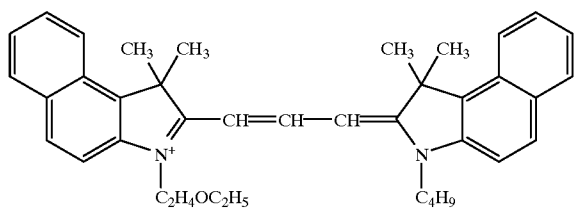
B-3
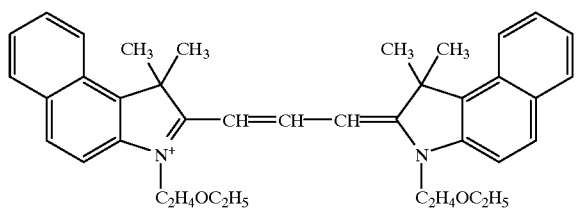
B-4
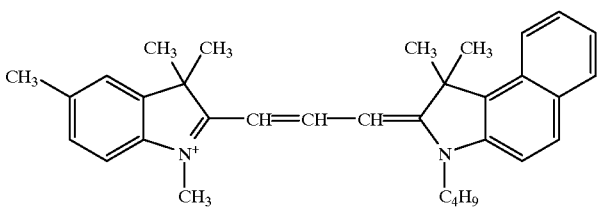
B-5
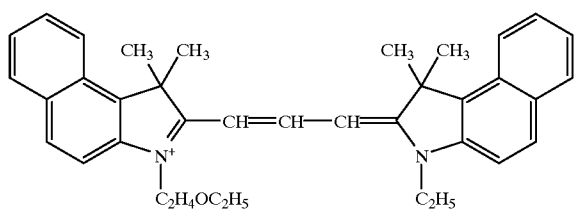
B-6
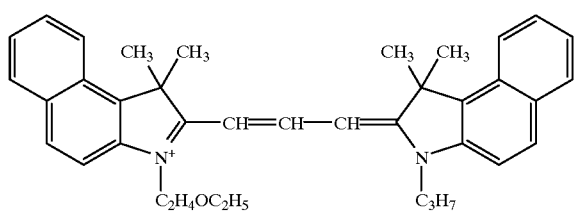
B-7

-continued
B-8
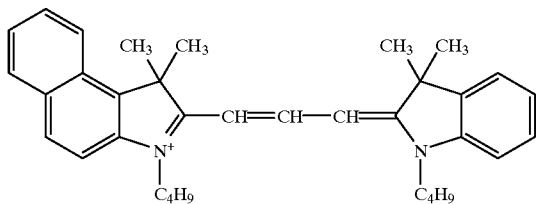
B-9
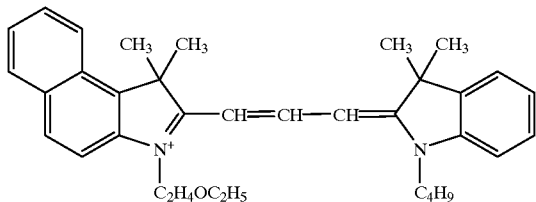
B-10
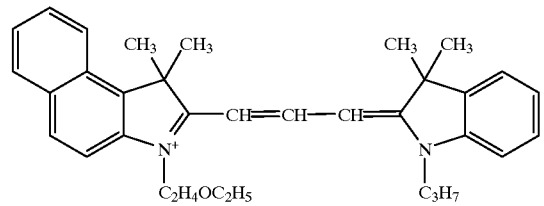
B-11
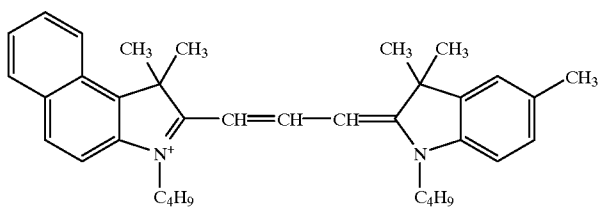
B-12
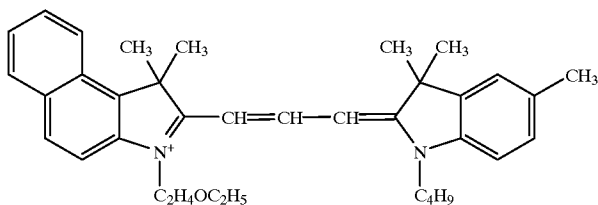
B-13
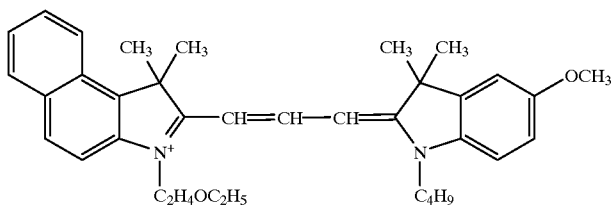
B-14
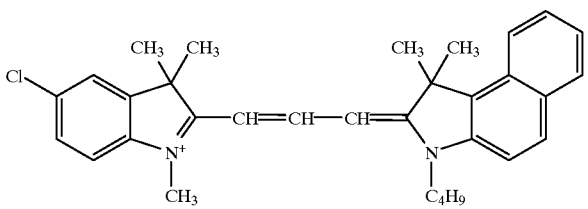
B-15
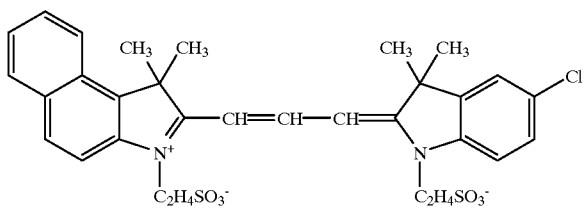

-continued
B-16
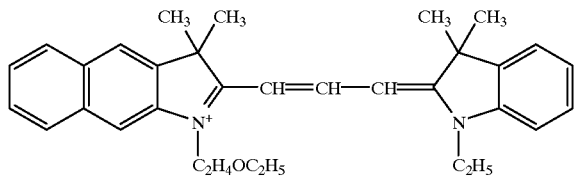
B-17
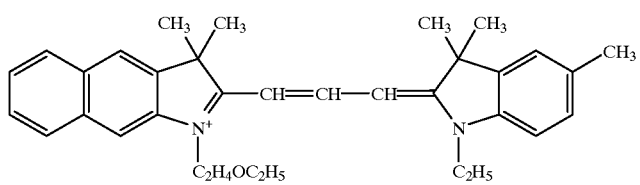
B-18
B-19
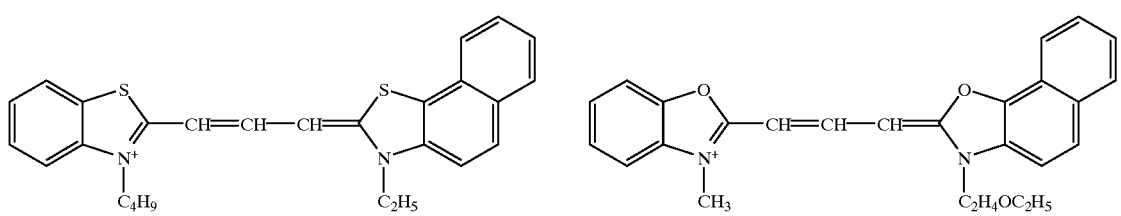
B-20
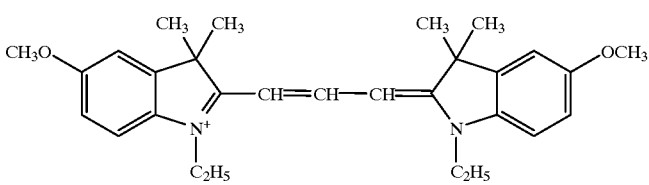
B-21
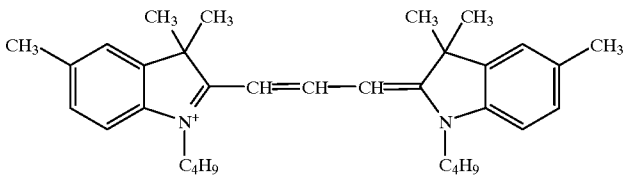
B-22
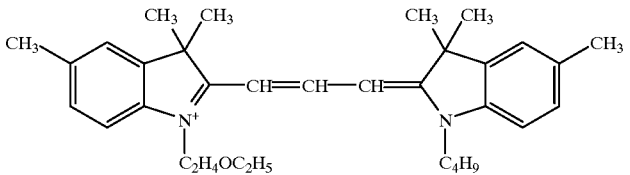
B-23
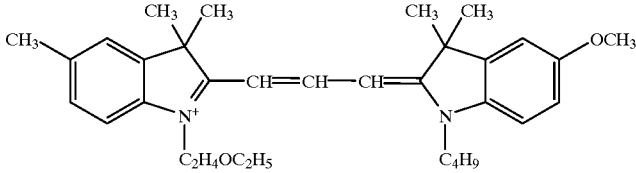
B-24

-continued
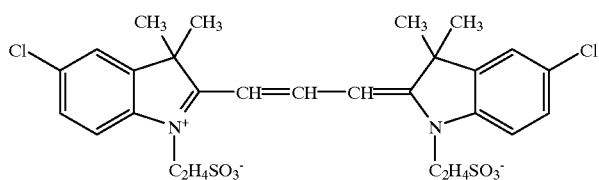
B-25
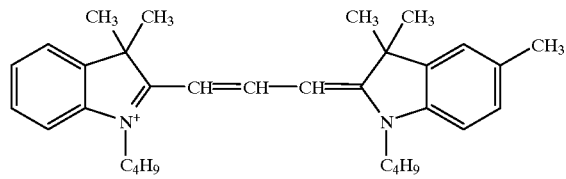
B-26
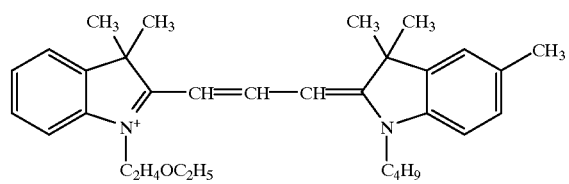
B-27
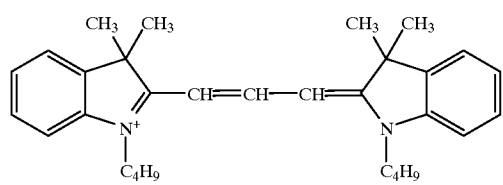
B-28
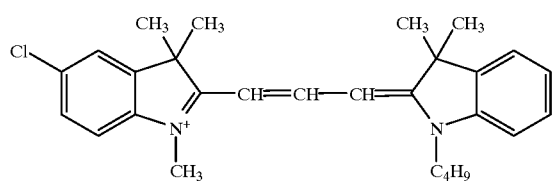
B-29
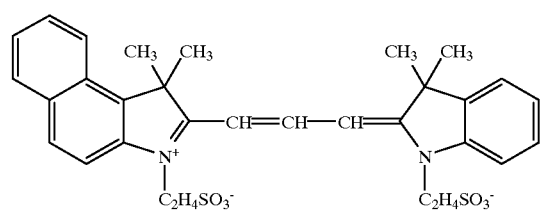
B-30
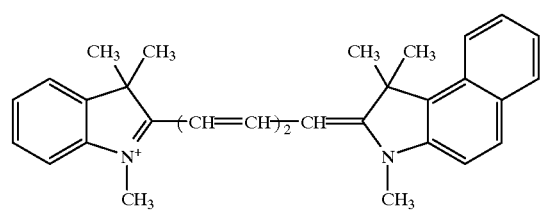
B-31
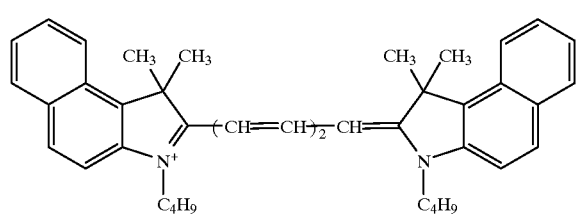
B-32
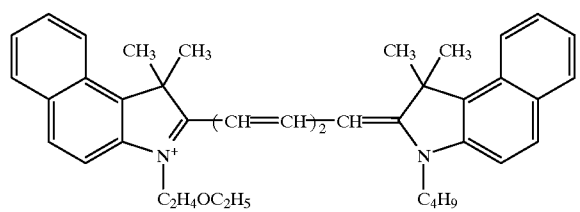
B-33

-continued
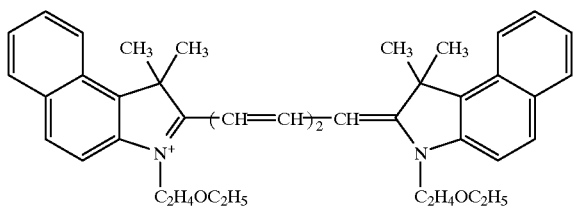
B-34
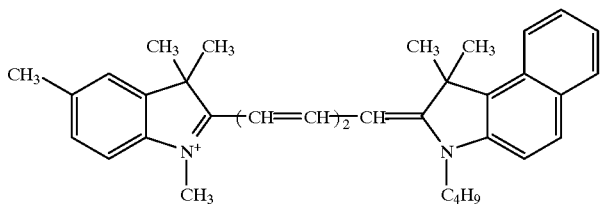
B-35
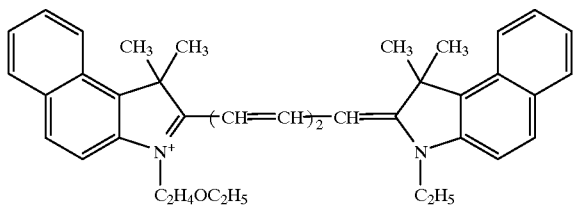
B-36
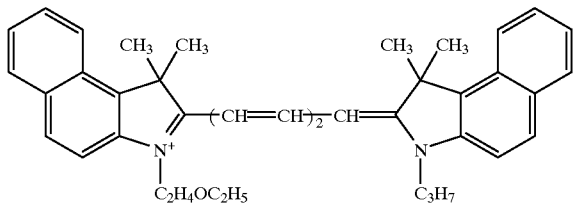
B-37
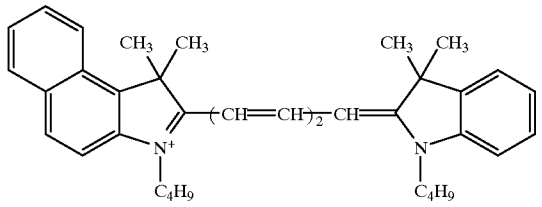
B-38
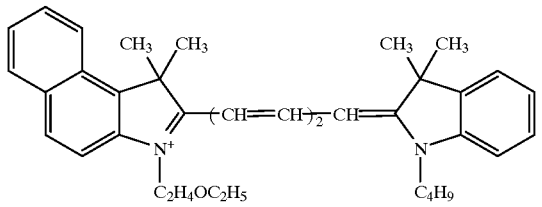
B-39
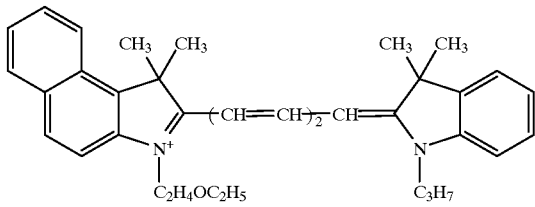
B-40
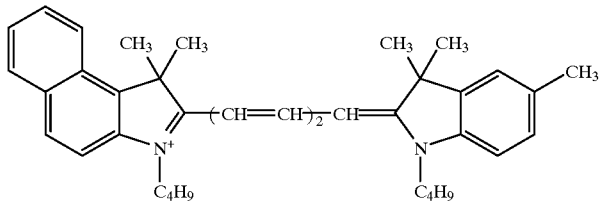
B-41

-continued
B-42
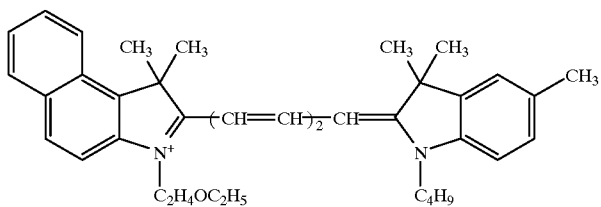
B-43
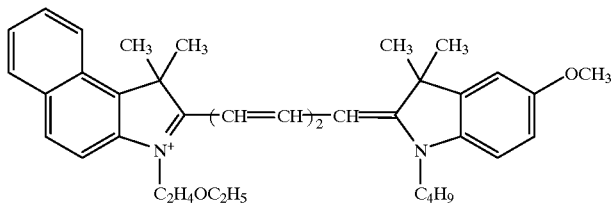
B-44
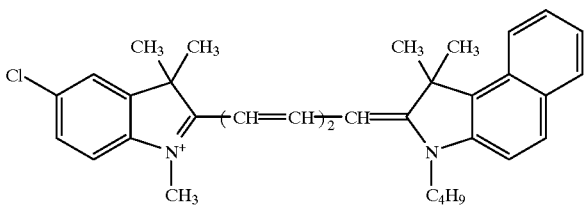
B-45
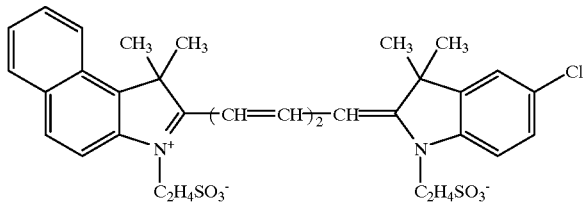
B-46
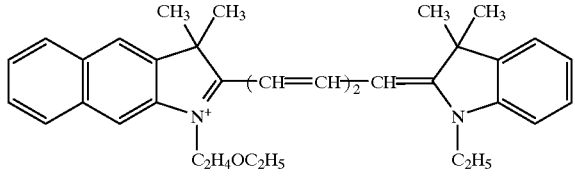
B-47
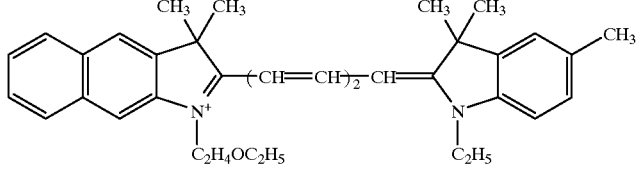
B-48
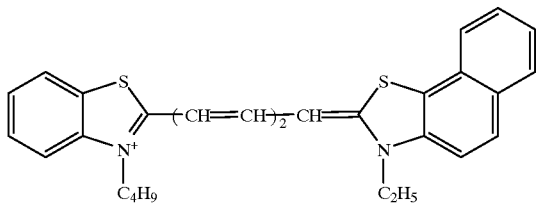
B-49
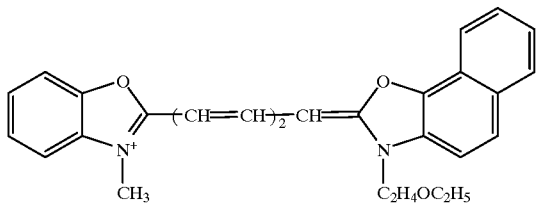

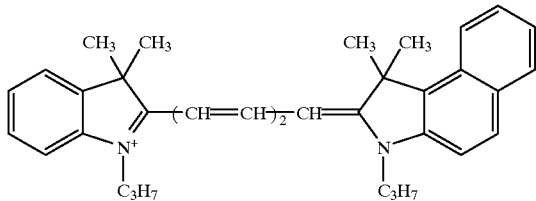

B-50

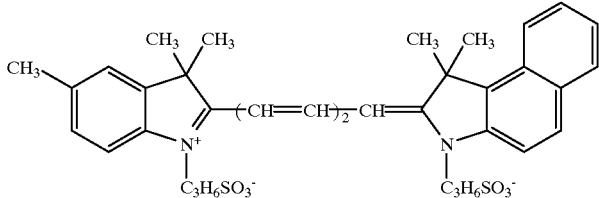

B-51

Next, the azo oxovanadium metal complex according to the invention is described.

The azo oxovanadium metal complex according to the invention is a metal complex of an azo compound of formula (III) with oxovanadium wherein the oxovanadium is present in the form of $VO^{2+}$ or $VO^{3+}$.

Referring to formula (III), A and B in formula (III) have the same meaning as A and B in formula (I), with their preferred examples being the same.

It is understood that the active hydrogen-bearing group in the azo compound of formula (III) coordinates to VO in the form of an acid anion (—$O^-$ where the active hydrogen-bearing group is —OH).

The azo oxovanadium metal complexes wherein the counterion is an ion of a cyanine dye of formula (II), one or two azo compounds of formula (III) coordinate to VO, and k in the wavelength region of recording/reading light having a short wavelength is up to 0.20 overlap the aforementioned salt-forming dyes for short wavelength. It is noted that when two azo compounds of formula (III) coordinate to VO, these azo compounds may be identical or different.

Next, formulae (IV) and (V) are described. In these formulae, X is an active hydrogen-bearing group, which is the same as that in formula (III), with its preferred examples being the same.

R is a nitro group, and letter n is equal to 0 or 1. When n is 1, the substitution position of the nitro group is not critical, but is preferably the meta-position relative to the nitro group preexisting in formula (IV) or (V).

$R^1$ and $R^2$ are alkyl groups, which are usually the same, but may be different. The total number of carbon atoms in $R^1$ and $R^2$ is 2 to 8. The number of carbon atoms in such an alkyl group is preferably 1 to 4. Exemplary alkyl groups are methyl, ethyl, n- and i-propyl, and n-, i-, s- and t-butyl groups. These alkyl groups may have a substituent such as a hydroxyl group, and exemplary substituted alkyl groups are hydroxylmethyl and hydroxyethyl.

The azo metal complex of the invention is obtained by reacting at least one of azo compounds of formulae (IV) and (V) with a metal compound. The center metal is preferably selected from Co, Mn, Ti, V, Ni, Cu, Zn, Mo, W, Ru, Fe, Pd, Pt, and Al. Among these, V, Mo and W may take the form of an oxide ion, for example, $VO^{2+}$, $VO^{3+}$, $MoO_2^+$, $MoO^{3+}$, and $WO^{3+}$. Further preferable examples of the center metal are oxovanadium (VO) such as $VO^{2+}$ and $VO^{3+}$, Co, Ni, and Cu.

Of the compounds of formulae (IV) and (V), azo compounds of formula (V) are especially preferred because the invention aims at recording and reading in the short wavelength region of 630 to 690 nm.

The oxovanadium complexes obtained from the azo compounds of formulae (IV) and (V) are encompassed within the oxovanadium complexes obtained from the azo compounds of formula (III), with the former being preferred ones among the latter complexes.

The azo metal complexes wherein the center metal is a transition metal, one or two azo compounds of formula (IV) or (V) coordinate thereto, the counterion is a cation of a cyanine dye of formula (II), and k in the wavelength region of recording/reading light having a short wavelength is up to 0.20 overlap the aforementioned salt-forming dyes.

In the azo metal complexes of the azo compounds of formulae (IV) and (V), when the ligand of the azo compound and the center metal are in a ratio of 2:1, two types of azo compounds may coordinate as the ligands. The above azo oxovanadium metal complexes and azo metal complexes sometimes have an electric charge depending on the valence of the center metal, and in such a case, a counter-ion is present. Examples of the counterion is an inorganic cation such as $Na^+$, $Li^+$ and $K^+$, $R^1R^2R^3R^4N^+$ wherein $R^1$, $R^2$, $R^3$ and $R^4$ each are a hydrogen atom, alkyl group or alkoxy group, and $R^1R^2R^3N^+$—$(CH_2)_k$—$N^+R^3R^2R^1$ wherein $R^1$, $R^2$, $R^3$ and $R^4$ each are a hydrogen atom, alkyl group or alkoxy group, and k is 5 to 10. Of these, $R^1R^2R^3N^+$—$(CH_2)_k$—$N^+R^3R^2R^1$ are preferred from the standpoints of solubility and medium characteristics. The ions of trimethine cyanine dyes described in conjunction with the above salt-forming dyes are also preferred, of which trimethine indolenine cyanine dye cations are especially preferred.

Illustrative examples of the azo metal complex compounds which can be used herein are given below. They are shown by combinations of an azo compound, a center metal $M_1$, and a counterion while the azo compounds are shown by combinations of A and B in formula (III). Where the counterion is an ion of a cyanine dye, examples are shown by combinations of A, B, $M_1$, m and counterion in accordance with formula (I).

It is noted that Me, Et, Pr, and Bu in A and B stand for methyl, ethyl, propyl and butyl, respectively.

| | A—N=N—B | | | (III) |
|---|---|---|---|---|
| Compound | A | B | $M_1$ | Counterion |
| 1 | NO2-phenyl-OH (with methyl) | -phenyl-NMe2 (with HO) | VO | $(Me)_2\overset{+}{N}(CH_2)_6\overset{+}{N}(Me)_2$ / H H |

-continued $$A-N=N-B \qquad (III)$$

| Compound | A | B | $M_1$ | Counterion |
|---|---|---|---|---|
| 2 | 4-NO₂-2-methylphenol (OH at 1, Me at 2, NO₂ at 4) | 2-methyl-5-(dimethylamino)phenol (Me, OH, NMe₂) | Co | $(Me)_2\overset{+}{\underset{H}{N}}(CH_2)_6\overset{+}{\underset{H}{N}}(Me)_2$ |
| 3 | 4-NO₂-2-methylphenol | 2-methyl-5-(diethylamino)phenol (Me, OH, NEt₂) | VO | $(Me)_2\overset{+}{\underset{H}{N}}(CH_2)_6\overset{+}{\underset{H}{N}}(Me)_2$ |
| 4 | 4-NO₂-2-methylphenol | 2-methyl-5-(dibutylamino)phenol (Me, OH, NBu₂) | VO | $(Me)_2\overset{+}{\underset{H}{N}}(CH_2)_6\overset{+}{\underset{H}{N}}(Me)_2$ |
| 5 | 4-NO₂-3-methylphenol (O₂N, Me, OH) | 2-methyl-5-(dibutylamino)phenol (Me, OH, NBu₂) | VO | $(Me)_2\overset{+}{\underset{H}{N}}(CH_2)_6\overset{+}{\underset{H}{N}}(Me)_2$ |
| 6 | 4-NO₂-2-methylphenol | 2-methyl-5-methoxyphenol (Me, OH, OMe) | VO | $(Me)_2\overset{+}{\underset{H}{N}}(CH_2)_6\overset{+}{\underset{H}{N}}(Me)_2$ |
| 7 | 4-NO₂-3-methylphenol (O₂N, Me, OH) | 2-methyl-5-(diethylamino)phenol (Me, OH, NEt₂) | VO | $(Me)_2\overset{+}{\underset{H}{N}}(CH_2)_6\overset{+}{\underset{H}{N}}(Me)_2$ |
| 8 | 4-NO₂-3-methylphenol (O₂N, Me, OH) | 2-methyl-5-(dimethylamino)phenol (Me, OH, NMe₂) | VO | $(Me)_2\overset{+}{\underset{H}{N}}(CH_2)_6\overset{+}{\underset{H}{N}}(Me)_2$ |
| 9 | 2-methylphenol (Me, OH) | 2-methyl-5-(dimethylamino)phenol (Me, OH, NMe₂) | VO | $(Me)_2\overset{+}{\underset{H}{N}}(CH_2)_7\overset{+}{\underset{H}{N}}(Me)_2$ |
| 10 | 4-sulfamoyl-3-methylphenol (H₂NO₂S, Me, OH) | 2-methyl-5-(dimethylamino)phenol (Me, OH, NMe₂) | VO | $(Me)_2\overset{+}{\underset{H}{N}}(CH_2)_7\overset{+}{\underset{H}{N}}(Me)_2$ |

-continued
| Compound | A | B | $M_1$ | Counterion |
|---|---|---|---|---|
| 11 | 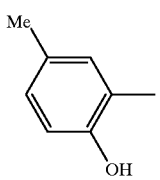 | 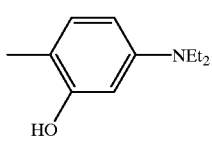 | VO | $(Me)_2\overset{+}{N}(CH_2)_7\overset{+}{N}(Me)_2$<br>H        H |
| 12 | 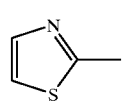 | 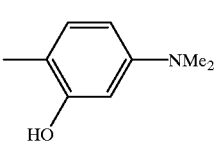 | VO | $(Me)_2\overset{+}{N}(CH_2)_7\overset{+}{N}(Me)_2$<br>H        H |
| 13 | 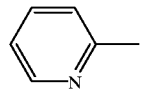 | 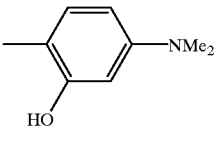 | VO | $H_3\overset{+}{N}(CH_2)_7\overset{+}{N}H_3$ |
| 14 | 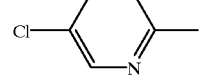 | 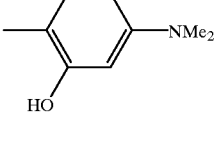 | VO | $H_3\overset{+}{N}(CH_2)_7\overset{+}{N}H_3$ |
| 15 | 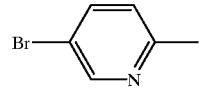 | 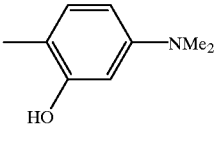 | VO | $H_3\overset{+}{N}(CH_2)_7\overset{+}{N}H_3$ |
| 16 | 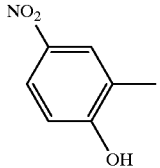 | 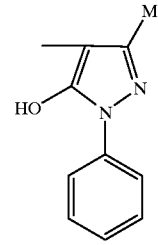 | VO | $H_3\overset{+}{N}(CH_2)_7\overset{+}{N}H_3$ |
| 17 | 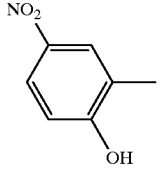 | 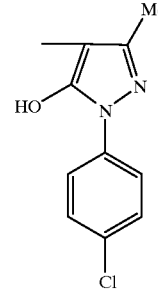 | VO | $H_3\overset{+}{N}(CH_2)_7\overset{+}{N}H_3$ |
(III) $A-N=N-B$ -continued

| | A—N=N—B | | | (III) |
|---|---|---|---|---|
| Compound | A | B | $M_1$ | Counterion |
| 18 | 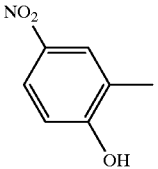 | 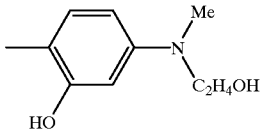 | VO | $H_3\overset{+}{N}(CH_2)_8\overset{+}{N}H_3$ |
| 19 | 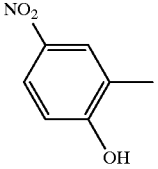 | 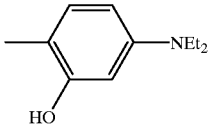 | Ni | $H_3\overset{+}{N}(CH_2)_8\overset{+}{N}H_3$ |
| 20 | 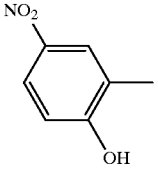 | 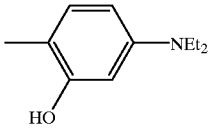 | Mn | $H_3\overset{+}{N}(CH_2)_8\overset{+}{N}H_3$ |
| 21 | 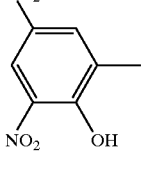 | 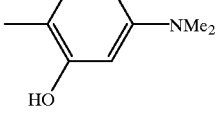 | VO | $(Me)_2\overset{+}{\underset{H}{N}}(CH_2)_6\overset{+}{\underset{H}{N}}(Me)_2$ |
| 22 | 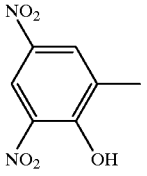 | 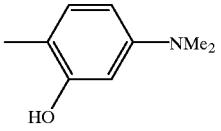 | Co | $(Me)_2\overset{+}{\underset{H}{N}}(CH_2)_6\overset{+}{\underset{H}{N}}(Me)_2$ |
| 23 | 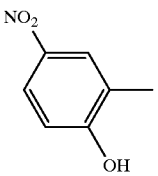 | 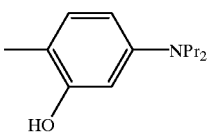 | VO | $(Me)_2\overset{+}{\underset{H}{N}}(CH_2)_6\overset{+}{\underset{H}{N}}(Me)_2$ |
| 24 | 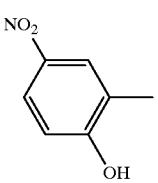 | 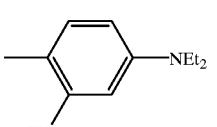 | Cu | $(Me)_2\overset{+}{\underset{H}{N}}(CH_2)_6\overset{+}{\underset{H}{N}}(Me)_2$ |

| Compound | A | B | $M_1$ | Counterion | m |
|---|---|---|---|---|---|
| | $(A-N=N-B)_m \cdot M_1$ | | | | (I) |
| C-1 | 4-Cl-2-methyl-5-nitrophenol (Cl, $O_2N$, OH, methyl) | 2-methyl-5-(dimethylamino)phenol (HO, $NMe_2$) | VO | B-8 | 2 |
| C-2 | 4-Cl-2-methyl-5-nitrophenol (Cl, $O_2N$, OH, methyl) | 2-methyl-5-(dibutylamino)phenol (HO, $NBu_2$) | VO | B-9 | 2 |
| C-3 (a ligand wherein A = $NO_2$-phenol-OH, B = phenol-OH-$NMe_2$; A = 4-$NO_2$-2-methylphenol, B = 2-methyl-5-($NMe_2$)phenol; 1:1 mixed ligand) | | | VO | B-3 | 2 |
| C-4 (a ligand wherein (A = $NO_2$-phenol-OH, B = phenol-OH-$NEt_2$); A = 4-$NO_2$-2-methylphenol, B = 2-methyl-5-($NEt_2$)phenol; 1:1 mixed ligand) | | | VO | B-8 | 2 |
| C-5 | 4-$NO_2$-2-methylphenol ($NO_2$, OH, methyl) | 2-methyl-5-(dimethylamino)phenol (HO, $NMe_2$) | VO | B-8 | 2 |

-continued
| Compound | A | B | $M_1$ | Counterion | (I) m |
|---|---|---|---|---|---|
| C-6 | 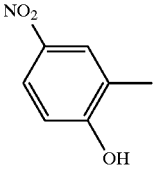 | 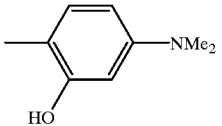 | Co | B-8 | 2 |
| C-7 | 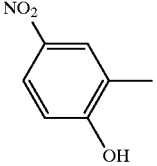 | 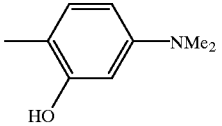 | Ni | B-8 | 2 |
| C-8 | 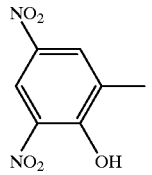 | 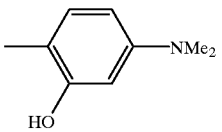 | VO | B-9 | 2 |
| C-9 | 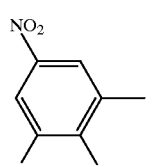 | 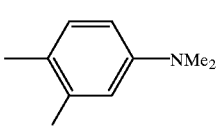 | Co | B-9 | 2 |
| C-10 | 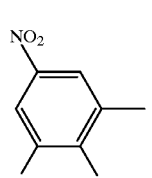 | 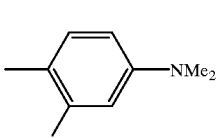 | Ni | B-9 | 2 |
| C-11 | 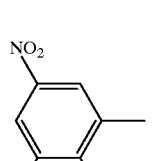 | 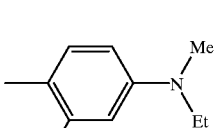 | VO | B-11 | 2 |
| C-12 | 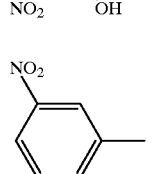 | 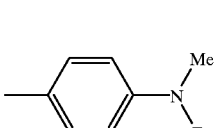 | VO | B-12 | 2 |
| C-13 | 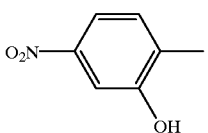 | 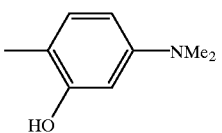 | Co | B-13 | 2 |

-continued
| Compound | A | B | $M_1$ | Counterion | (I) m |
|---|---|---|---|---|---|
| C-14 | 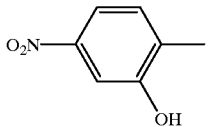 | 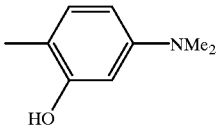 | Ni | B-15 | 2 |
| C-15 | 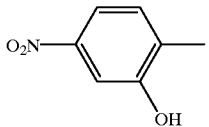 | 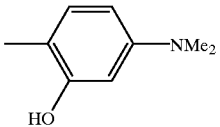 | VO | B-13 | 2 |
| C-16 | 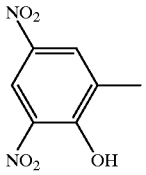 | 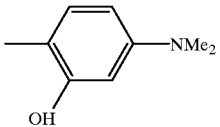 | VO | B-11 | 2 |
| C-17 | 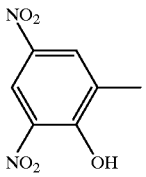 | 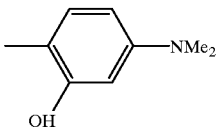 | Co | B-11 | 2 |
| C-18 | 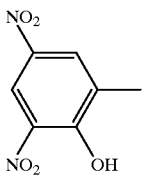 | 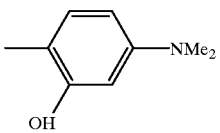 | Ni | B-12 | 2 |
| C-19 | 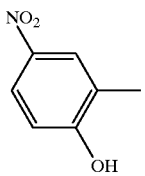 | 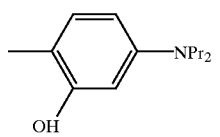 | VO | B-8 | 2 |
| C-20 | 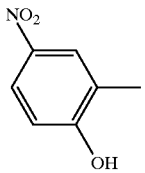 | 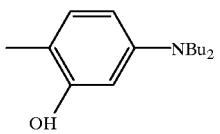 | VO | B-8 | 2 |
| C-21 | 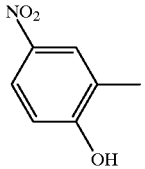 | 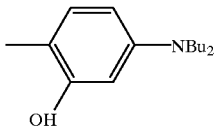 | Co | B-8 | 2 |
(A—N=N—B)$_m$·$M_1$ -continued

| Compound | A | B | $M_1$ | Counterion | (I) m |
|---|---|---|---|---|---|
| C-22 | 4-NO$_2$-2-methyl-phenol | 4-methyl-3-hydroxy-N,N-dibutylaniline | Ni | B-8 | 2 |
| C-23 | 4-NO$_2$-2-methyl-phenol | 4-methyl-3-hydroxy-N,N-dibutylaniline | Cu | B-8 | 2 |
| C-24 | 4-NO$_2$-2-methyl-phenol | 1-amino-2-methyl-3-hydroxynaphthalene | VO | B-9 | 2 |
| C-25 | 4-NO$_2$-2-methyl-phenol | 1-amino-2-methyl-3-hydroxynaphthalene | Co | B-19 | 2 |
| C-26 | 4-NO$_2$-2-methyl-pyridine | 2-hydroxy-4-methyl-N,N-dimethylaniline | Co | B-15 | 1 |
| C-27 | 4-NO$_2$-2-methyl-phenol | 4-methyl-3-hydroxy-N,N-diethylaniline | Co | B-8 | 2 |
| C-28 | 4-NO$_2$-2-methyl-phenol | 4-methyl-3-hydroxy-N,N-diethylaniline | VO | B-8 | 2 |
| C-29 | (A = NO$_2$-, 2-hydroxyphenyl) | 2-hydroxy-4-(N,N-diethylamino)phenyl | Co | B-21 | 2 |

(a ligand wherein

-continued
| Compound | A | B | $M_1$ | Counterion | (I) m |
|---|---|---|---|---|---|
| | A = 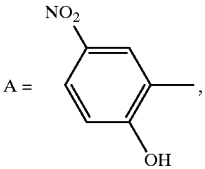, | B = 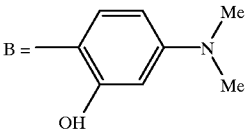 | | | |
| | 1:1 mixed ligand | | | | |
| C-30 | 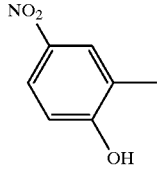 | 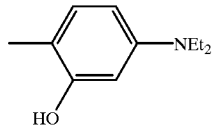 | VO | B-26 | 2 |
| C-31 | 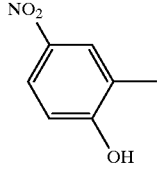 | 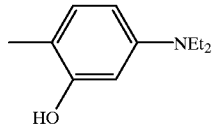 | Co | B-28 | 2 |
| C-32 | 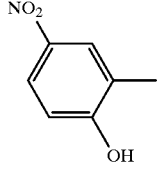 | 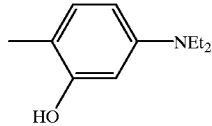 | Co | B-18 | 2 |
| D-1 | 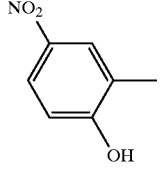 | 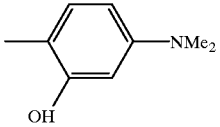 | VO | B-39 | 2 |
| D-2 | 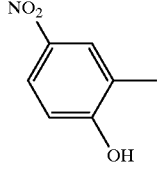 | 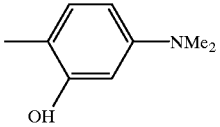 | Co | B-48 | 2 |
| D-3 | 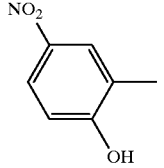 | 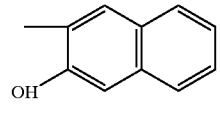 | VO | B-42 | 2 |
| D-4 | 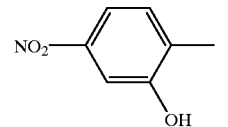 | 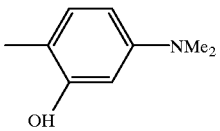 | Co | B-32 | 2 |

-continued
| Compound | A | B | $M_1$ | Counterion | (I) m |
|---|---|---|---|---|---|
| | (A—N=N—B)$_m$·$M_1$ | | | | |
| D-5 | 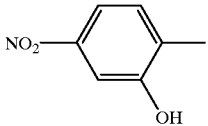 | 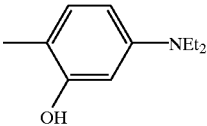 | Co | B-32 | 2 |
| D-6 | 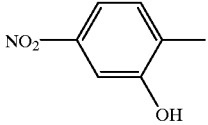 | 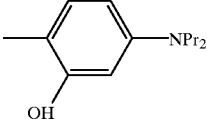 | Co | B-32 | 2 |
| D-7 | 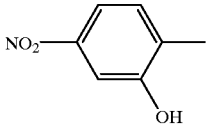 | 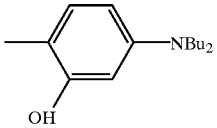 | Co | B-32 | 2 |
| D-8 | 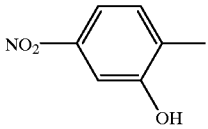 | 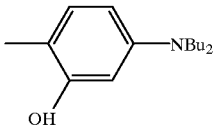 | Ni | B-50 | 2 |
| D-9 | 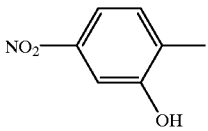 | 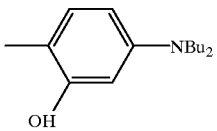 | VO | B-50 | 2 |
| D-10 | 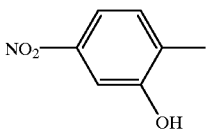 |  | Co | B-35 | 2 |
| D-11 | 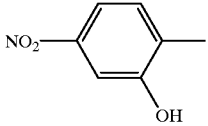 | 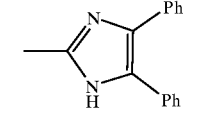 | Co | B-41 | 2 |
| D-12 | 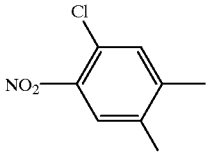 | 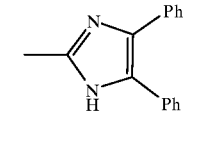 | Co | B-41 | 2 |
| D-13 | 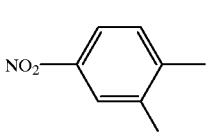 | 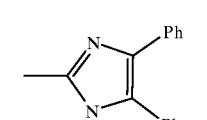 | Co | B-41 | 2 |

-continued

| Compound | A | B | $M_1$ | Counterion | (I) m |
|---|---|---|---|---|---|
| D-14 | 2-methyl-5-nitrobenzenesulfonic acid group | 2-methyl-4,5-diphenylimidazole group | Co | B-41 | 2 |
| D-15 | benzothiazol-2-yl | 4-methyl-3-sulfo-N,N-diethylaniline group | Co | B-45 | 1 |
| D-16 | 5-chloropyridin-2-yl | 4-methyl-3-carboxy-N,N-diethylaniline group | Co | B-45 | 1 |
| D-17 | 5-chloropyridin-2-yl | 4-methyl-3-sulfo-N,N-diethylaniline group | Co | B-51 | 1 |
| D-18 | benzothiazol-2-yl | 4-methyl-3-carboxy-N,N-dimethylaniline group | Co | B-51 | 1 |
| D-19 | 6-methylbenzothiazol-2-yl | 4-methyl-3-sulfo-5-methyl-N,N-dibutylaniline group | Co | B-51 | 1 |
| D-20 | 6-chlorobenzothiazol-2-yl | 4-methoxy-2-carboxy-N,N-dimethylaniline group | Co | B-51 | 1 |
| D-21 | 2-methyl-4-nitro-6-hydroxyphenyl | 2-hydroxy-4-(N,N-dibutylamino)-methylphenyl | Cu | B-32 | 2 |
| D-22 | 2-methyl-4-nitro-6-hydroxyphenyl | 2-hydroxy-4-(N,N-dibutylamino)-methylphenyl | Co | B-49 | 2 |

The azo compounds used herein can be synthesized in accordance with the disclosure of Furukawa, Anal. Chim. Acta., 140, 289 (1982), for example. The compounds can be identified by a mass spectrum, $^1$H-nuclear magnetic resonance spectrum, infrared absorption spectrum, elemental analysis, etc.

Further, the azo metal complex compounds can be obtained by reacting azo compounds as mentioned above with metal compounds in aqueous solvents such as water-alcohol solvents. The metal compounds which are generally used herein include chlorides (for example, cobalt chloride, zinc chloride, chromium chloride, manganese chloride, iron chloride, and vanadium oxytrichloride) and complex compounds (for example, vanadium acetylacetone). Complex forming reaction may be carried out at a temperature of about 90° C. for about 10 hours whereupon crystals are generally obtained. If necessary to provide the desired counterion (e.g., cyanine dye ion), salt exchange is carried out.

The resulting compound can be identified by elemental analysis, visible/ultraviolet absorption spectroscopy, fluorescent x-ray analysis, etc.

Synthesis examples are shown below.

Synthesis Example 1

Synthesis of Compound 1

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. The diazonium salt was slowly added to a solution of 1.37 g (10 mmol) of N,N-dimethyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.606 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.67 g of a complex.

This complex, 0.67 g (1 mmol), was dissolved in 6.7 g of DMF, with which 0.14 g (3 mmol) of formic acid and 0.086 g (0.5 mmol) of N,N,N',N'-tetramethyl-1,6-diaminohexane were mixed. The mixture was subject to reaction at 70° C. for 2 hours. After the completion of reaction, water was added for precipitation. Crystals were collected by suction filtration and then dried in vacuum, obtaining 0.67 g of a complex.

Synthesis Example 2

Synthesis of Compound 2

To 0.606 g (2 mmol) of the ligand obtained in Synthesis Example 1 were added 0.012 g of sodium hydroxide, 10 g of water and 20 g of ethanol. With 0.129 g (1 mmol) of cobalt (II) chloride added, the mixture was subject to reaction at 95° C. for 16 hours. After the completion of reaction, crystals were collected by suction filtration and then dried in vacuum, obtaining 0.60 g of a complex. Thereafter, the end compound was obtained as in Synthesis Example 1.

Synthesis Example 3

Synthesis of Compound 3

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. The diazonium salt was slowly added to a solution of 1.65 g (10 mmol) of N,N-diethyl-m-aminophenol in 20 g of water and 2.0 g (50 mmol) of sodium hydroxide for effecting coupling reaction. After the completion of reaction , crystals were collected by suction filtration and then dried in vacuum, obtaining a ligand.

To 0.662 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.65 g of a complex. Thereafter, the end compound was obtained as in Synthesis Example 1.

Synthesis Example 4

Synthesis of Compound 4

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. The diazonium salt was slowly added to a solution of 2.21 g (10 mmol) of N,N-dibutyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.774 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.65 g of a complex. Thereafter, the end compound was obtained as in Synthesis Example 1.

Synthesis Example 5

Synthesis of Compound 5

In 2 ml of water and 20 ml of ethanol was dissolved 1.54 g (10 mmol) of 2-amino-5-nitrophenol. With stirring at 0 to 5° C., 0.69 g (10 mmol) of sodium nitrite in 15 ml of water was slowly added for diazotation. The diazonium salt was slowly added to a solution of 2.21 g (10 mmol) of N,N-dibutyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.774 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.65 g of a complex. Thereafter, the end compound was obtained as in Synthesis Example 1.

Synthesis Example 6

Synthesis of Compound 6

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. The diazonium salt was slowly added to a solution of 1.24 g (10 mmol) of 3-methoxyphenol in 20 g of water and 2.0 g (50 mmol) of sodium hydroxide for effecting coupling reaction. After the completion of reaction, crystals were collected by suction filtration and then dried in vacuum, obtaining a ligand.

To 0.580 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.65 g of a complex. Thereafter, the end compound was obtained as in Synthesis Example 1.

Synthesis Example 7

Synthesis of Compound 7

In 2 ml of water and 20 ml of ethanol was dissolved 1.54 g (10 mmol) of 2-amino-5-nitrophenol. With stirring at 0 to 5° C., 0.69 g (10 mmol) of sodium nitrite in 15 ml of water was slowly added for diazotation. The diazonium salt was slowly added to a solution of 1.65 g (10 mmol) of N,N-diethyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.662 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.65 g of a complex. Thereafter, the end compound was obtained as in Synthesis Example 1.

Synthesis Example 8

Synthesis of Compound 21

In 2 ml of water and 20 ml of ethanol was dissolved 1.99 g (10 mmol) of 2-amino-4,6-dinitrophenol. With stirring at 0 to 5° C., 0.69 g (10 mmol) of sodium nitrite in 15 ml of water was slowly added for diazotation. The diazonium salt was slowly added to a solution of 1.37 g (10 mmol) of N,N-dimethyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.696 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.80 g of a complex. Thereafter, the end compound was obtained as in Synthesis Example 1.

This complex, 0.76 g (1 mmol), was dissolved in 8.0 g of DMF, with which 0.14 g (3 mmol) of formic acid and 0.086 g (0.5 mmol) of N,N,N',N'-tetramethyl-1,6-diaminohexane were mixed. The mixture was subject to reaction at 70° C. for 2 hours. After the completion of reaction, water was added for precipitation. Crystals were collected by suction filtration and then dried in vacuum, obtaining 0.73 g of a complex.

Synthesis Example 9

Synthesis of Compound C-5

A solution of 0.67 g (1 mmol) of Compound 1 in 6.7 g of DMF was mixed with 0.58 g (1 mmol) of a $ClO_4$ salt of Compound B-9, and reaction was effected at 70° C. for 2 hours. After the completion of reaction, water was added for precipitation. Crystals were collected by suction filtration and then dried in vacuum, obtaining 0.88 g of a complex.

Synthesis Example 10

Synthesis of Compound C-6

A solution of 0.68 g (1 mmol) of Compound 2 in 6.7 g of DMF was mixed with 0.58 g (1 mmol) of a $ClO_4$ salt of Compound B-9, and reaction was effected at 70° C. for 2 hours. After the completion of reaction, water was added for precipitation. Crystals were collected by suction filtration and then dried in vacuum, obtaining 0.90 g of a complex.

Synthesis Example 11

Synthesis of Compound C-24

In 2 ml of water and 20 ml of ethanol was dissolved 2.31 g (15 mmol) of 2-amino-4-nitrophenol. With stirring at 0 to 5° C., 1.09 g of sodium nitrite in 15 ml of water was slowly added for diazotation. Then a solution of 2.39 g (15 mmol) of 8-amino-2-naphthol in 30 g of ethanol and an aqueous solution of 20% sodium hydroxide were added dropwise to the solution so as to control its pH at 7 to 9. After the completion of reaction, crystals were collected by suction filtration and then dried in vacuum, obtaining a ligand.

To 0.648 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.58 g of a complex (Metal Complex A).

Equimolar amounts of this complex and a $ClO_4$ salt of Compound B-9 were dissolved in DMF, and reaction was effected at 70° C. for 2 hours. After the completion of reaction, water was added for precipitation. Crystals were collected by suction filtration and then dried in vacuum, obtaining the end compound.

Synthesis Example 12

Synthesis of Compound C-25

To 0.648 g (2 mmol) of the ligand obtained in Synthesis Example 11 were added 0.012 g of sodium hydroxide, 10 g of water and 20 g of ethanol. With 0.129 g (1 mmol) of cobalt (II) chloride added, the mixture was subject to reaction at 95° C. for 16 hours. After the completion of reaction, crystals were collected by suction filtration and then dried in vacuum, obtaining 0.52 g of a complex.

Equimolar amounts of this complex and a $ClO_4$ salt of Compound B-19 were dissolved in DMF, and reaction was effected at 70° C. for 2 hours. After the completion of reaction, water was added for precipitation. Crystals were collected by suction filtration and then dried in vacuum, obtaining the end compound.

Synthesis Example 13

Synthesis of Compound C-26

In 2 ml of water and 20 ml of ethanol was dissolved 1.39 g (10 mmol) of 2-amino-4-nitropyridine. With stirring at 0 to 5° C., 0.69 g (10 mmol) of sodium nitrite in 15 ml of water was slowly added for diazotation. Then the diazonium salt was slowly added to a solution of 1.37 g (10 mmol) of N,N-dimethyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.574 g (2 mmol) of the thus synthesized ligand were added 0.012 g of sodium hydroxide, 10 g of water and 20 g of ethanol. With 0.129 g (1 mmol) of cobalt (II) chloride added, the mixture was subject to reaction at 95° C. for 16 hours. After the completion of reaction, crystals were collected by suction filtration and then dried in vacuum, obtaining 0.60 g of a complex.

Equimolar amounts of this complex and a Na salt of Compound B-15 were dissolved in methanol, and the mixture was refluxed for 2 hours. After the completion of reaction, ice bag cooling caused precipitation of crystals which were collected by suction filtration. The crystals were dried in vacuum, obtaining the end compound.

Synthesis Example 14

Synthesis of Compound D-1

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. Then the diazonium salt was slowly added to a solution of 1.37 g (10 mmol) of N,N-dimethyl-m-aminophenol in 20 g of water and 2.0 g (50 mmol) of sodium hydroxide for effecting coupling reaction. After the completion of reaction, crystals were collected by suction filtration and then dried in vacuum, obtaining a ligand.

To 0.606 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.67 g of a complex (Metal Complex B).

Equimolar amounts of this complex and a $ClO_4$ salt of Compound B-39 were dissolved in DMF, and reaction was effected at 70° C. for 2 hours. After the completion of reaction, water was added for precipitation. Crystals were collected by suction filtration and then dried in vacuum, obtaining the end compound.

Synthesis Example 15

Synthesis of Compound D-2

To 0.606 g (2 mmol) of the ligand obtained in Synthesis Example 14 were added 0.012 g of sodium hydroxide, 10 g of water and 20 g of ethanol. With 0.129 g (1 mmol) of cobalt (II) chloride added, the mixture was subject to reaction at 95° C. for 16 hours. After the completion of reaction, crystals were collected by suction filtration and then dried in vacuum, obtaining 0.60 g of a complex.

Equimolar amounts of this complex and a $BF_4$ salt of Compound B-49 were dissolved in DMF, and reaction was effected at 70° C. for 2 hours. After the completion of reaction, water was added for precipitation. Crystals were collected by suction filtration and then dried in vacuum, obtaining the end compound.

Synthesis Example 16

Synthesis of Compound D-3

In 2 ml of water and 20 ml of ethanol was dissolved 1.54 g (10 mmol) of 2-amino-4-nitrophenol. With stirring at 0 to 5° C., 0.69 g (10 mmol) of sodium nitrite in 15 ml of water was slowly added for diazotation. Then a solution of 1.44 g (10 mmol) of 2-naphthol in 20 g of ethanol and an aqueous solution of 20% sodium hydroxide were added dropwise to the solution so as to control its pH at 7 to 9. After the completion of reaction, crystals were collected by suction filtration and then dried in vacuum, obtaining a ligand.

To 0.544 g (2 mmol) of the thus synthesized ligand were added 0.012 g of sodium hydroxide, 10 g of water and 20 g of ethanol. With 0.265 g (1 mmol) of vanadium acetylacetone added, the mixture was subject to reaction at 95° C. for 16 hours. After the completion of reaction, crystals were collected by suction filtration and then dried in vacuum, obtaining 0.55 g of a complex.

Equimolar amounts of this complex and a $PF_6$ salt of Compound B-42 were dissolved in DMF, and reaction was effected at 70° C. for 2 hours. After the completion of reaction, water was added for precipitation. Crystals were collected by suction filtration and then dried in vacuum, obtaining the end compound.

Other exemplified compounds can be synthesized as above.

The azo metal complex compounds according to the invention have a melting point (mp) of 100 to 300° C. and a λmax (as measured on a dye thin film of 50 nm thick) in the range of 590 to 625 nm for the short wavelength application and in the range of 600 to 700 nm for the long wavelength application.

Of these dyes, those dyes for the short wavelength application have a complex index of refraction at 635 nm or 650 nm whose real part n is 2.10 to 2.7 and whose imaginary part k is up to 0.20, preferably 0.02 to 0.10. On the other hand, those dyes for the long wavelength application have a complex index of refraction at 780 nm whose real part n is 2.0 to 2.6 and whose imaginary part k is up to 0.20, preferably 0.02 to 0.10. Understandably, n and k are determined as previously described.

For the above-illustrated compounds, their λmax, n and k are shown below. For the compounds having a cyanine dye ion as the counterion, all the exemplified compounds are shown. For the other compounds, those used in examples of the two wavelength accommodating type are shown.

TABLE 1

| Compound | n (650 nm) | k | λmax/nm |
| --- | --- | --- | --- |
| 1 | 2.35 | 0.02 | 618 |
| 2 | 2.40 | 0.03 | 620 |
| 3 | 2.25 | 0.03 | 625 |
| 5 | 2.25 | 0.03 | 620 |
| 7 | 2.35 | 0.03 | 625 |
| 8 | 2.50 | 0.03 | 628 |
| 19 | 2.30 | 0.02 | 610 |
| 20 | 2.35 | 0.02 | 615 |

TABLE 2

| Compound | n (650 nm) | k | λmax/nm |
| --- | --- | --- | --- |
| C-1 | 2.50 | 0.12 | 630 |
| C-2 | 2.50 | 0.10 | 631 |
| C-3 | 2.40 | 0.02 | 622 |
| C-4 | 2.30 | 0.05 | 620 |
| C-5 | 2.35 | 0.04 | 618 |
| C-6 | 2.40 | 0.02 | 620 |
| C-7 | 2.35 | 0.02 | 615 |
| C-8 | 2.40 | 0.08 | 625 |
| C-9 | 2.45 | 0.12 | 630 |
| C-10 | 2.40 | 0.07 | 628 |
| C-11 | 2.45 | 0.08 | 626 |
| C-12 | 2.40 | 0.07 | 625 |
| C-13 | 2.50 | 0.03 | 620 |
| C-14 | 2.40 | 0.02 | 618 |
| C-15 | 2.45 | 0.03 | 622 |
| C-16 | 2.40 | 0.05 | 623 |
| C-17 | 2.45 | 0.07 | 622 |
| C-18 | 2.35 | 0.04 | 625 |
| C-19 | 2.35 | 0.02 | 618 |
| C-20 | 2.35 | 0.02 | 619 |
| C-21 | 2.40 | 0.05 | 623 |
| C-22 | 2.35 | 0.04 | 621 |
| C-23 | 2.40 | 0.06 | 625 |
| C-24 | 2.40 | 0.10 | 629 |
| C-25 | 2.40 | 0.13 | 630 |
| C-26 | 2.30 | 0.08 | 628 |
| C-27 | 2.40 | 0.08 | 627 |
| C-28 | 2.35 | 0.04 | 620 |
| C-29 | 2.40 | 0.07 | 625 |
| C-30 | 2.35 | 0.04 | 621 |
| C-31 | 2.30 | 0.02 | 618 |
| C-32 | 2.30 | 0.15 | 632 |

TABLE 3

| Compound | n (650 nm) | k | λmax/nm |
| --- | --- | --- | --- |
| D-1 | 2.35 | 0.02 | 705 |
| D-2 | 2.25 | 0.03 | 700 |
| D-3 | 2.45 | 0.04 | 715 |
| D-4 | 2.45 | 0.07 | 725 |
| D-5 | 2.45 | 0.07 | 723 |
| D-6 | 2.40 | 0.07 | 724 |
| D-7 | 2.40 | 0.07 | 724 |
| D-8 | 2.20 | 0.03 | 703 |
| D-9 | 2.15 | 0.02 | 700 |
| D-10 | 2.20 | 0.05 | 710 |
| D-11 | 2.35 | 0.10 | 730 |
| D-12 | 2.45 | 0.13 | 735 |
| D-13 | 2.35 | 0.07 | 715 |
| D-14 | 2.35 | 0.07 | 713 |
| D-15 | 2.35 | 0.08 | 715 |
| D-16 | 2.35 | 0.07 | 718 |
| D-17 | 2.25 | 0.07 | 717 |
| D-18 | 2.45 | 0.08 | 715 |
| D-19 | 2.30 | 0.05 | 710 |

TABLE 3-continued

| Compound | n (650 nm) | k | λmax/nm |
|---|---|---|---|
| D-20 | 2.35 | 0.05 | 711 |
| D-21 | 2.45 | 0.08 | 715 |
| D-22 | 2.20 | 0.02 | 701 |

The azo metal complexes of the invention which can be used as the dye for the recording layer may be used alone or in admixture of two or more.

These compounds are highly resistant to light and fully soluble in organic solvents, that is, have a high solubility in coating solvents which do not attack polycarbonate (PC) resins commonly used as the substrate material for optical recording media.

Recording layers using these compounds are especially preferred for use in write-once type optical recording discs (CD-R) and digital video discs (DVD-R) whereby recording and reading at the conventional wavelength or a short wavelength becomes possible depending on the optical characteristics of a particular compound. The recording layer is preferably formed using a coating solution containing a dye. Especially preferred is a spin coating technique of applying and spreading a coating solution onto a rotating substrate. Alternatively, gravure coating, spray coating and dipping may be used. Note that the coating solvent used herein will be described later.

After spin coating as mentioned above has been completed, the coating is dried, if required. The thus formed recording layer has usually a thickness of 500 to 3,000 Å although it may be appropriately determined depending on the desired reflectance, etc.

It is understood that the dye content of the coating solution is preferably 0.05 to 10% by weight. Since the azo metal complex dye of the invention is well soluble, a coating solution of such concentration can be readily prepared. More illustratively, the azo metal complex dyes according to the invention show a high solubility mainly in polar solvents, for example, a solubility of 0.5 to 10% by weight in alcohols and cellosolve or alkoxyalcohol solvents, ketoalcohols such as diacetone alcohol, ketones such as cyclohexanone, and fluorinated alcohols such as 2,2,3,3-tetrafluoropropanol. In particular, the dyes are soluble in ethyl cellosolve and 2,2,3,3-tetrafluoropropanol, which are appropriate coating solvents in coating on polycarbonate disc substrates, in a concentration of more than 4% by weight, enabling brief formation of a spin coated film of quality.

The coating solution may optionally contain binders, dispersants, and stabilizers.

In addition to the azo metal complex, the recording layer of the optical recording medium according to the invention may contain a light absorbing dye of another type. Examples of the other dye include phthalocyanine dyes, cyanine dyes, metal complex dyes of a type other then the aforementioned, styryl dyes, porphyrin dyes, azo dyes of a type other than the aforementioned, and formazane metal complexes.

In such embodiments, such a dye may be contained in the coating solution, from which a recording layer is formed.

Of the above-described azo metal complex compounds, the salt-forming dyes having a pentamethine cyanine dye ion as the counterion (compounds for the long wavelength application) are preferably used, due to their optical characteristics, in CD-R of carrying out recording and reading at a wavelength of about 770 to 830 nm, especially about 780 nm.

The salt-forming dyes having a trimethine cyanine dye ion as the counterion, the azo oxovanadium metal complexes, and the azo metal complexes having compounds of formulae (IV) and (V) as the ligand (compounds for the short wavelength application) are preferably used, due to their optical characteristics, in DVD-R of carrying out recording and reading at a wavelength of about 690 to 630 nm, especially about 635 to 680 nm.

Also the compounds for the short wavelength application are appropriate for use in optical recording media which can be recorded and read at two wavelengths, a short wavelength of about 630 to 690 nm, especially about 635 to 680 nm and a conventional wavelength of about 770 to 830 nm, especially about 780 nm or optical recording media which can be recorded at either of the two wavelengths and read at the other wavelength. In this embodiment, the inventive medium is suitable for use in the recording and reading mode of CD-RII involving recording at the conventional wavelength of about 780 nm and reading at two wavelengths, a short wavelength and the conventional wavelength of about 780 nm. For such application, the recording layer should preferably contain, in combination, an azo metal complex compound for the short wavelength application according to the invent on and a dye having different optical characteristics (such as absorption characteristics), typically different optical constants. A dye having an absorption maximum (λmax) at about 680 to 750 nm is preferably contained in addition to the azo metal complex for the short wavelength application according to the invention. The dye having such an absorption maximum (λmax) may be selected from the above-mentioned dyes. Among others, a choice is generally made of phthalocyanine dyes and pentamethinecyanine dyes. The compounds for the long wavelength application according to the invention may also be used.

Especially for use in a recording layer of the CD-RII mode involving recording and reading at two wavelengths as mentioned above, the azo metal complex should preferably have a complex index of refraction at 650 nm whose real part n is 1.8 to 2.6 and imaginary part k is 0.02 to 0.20. The other dye to be combined therewith should preferable have a complex index of refraction at 780 nm whose real part n is 1.8 to 2.6 and imaginary part k is 0.02 to 0.30, especially 0.02 to 0.15 for use in a recording layer of the laminate layer type. For the other dye, the half band width of the absorption spectrum of a thin film thereof, that is, the half band width of a spectral line near λmax is preferably up to 170 nm, more preferably up to 150 nm. The lower limit of the half band width is generally 50 nm though not critical. The use of a dye having such a half band width eliminates any influence on the absorption characteristics of the azo metal complex used in combination so that a satisfactory reflectance and modulation in a short wavelength region are available. In contrast, if the half band width exceeds 170 nm, the absorption edge overlaps the wavelength region of a short wavelength laser, causing a loss of reflectance in the short wavelength region. It is noted that the half band width is determined by preparing a sample in which a dye film is formed on a transparent substrate such that the transmittance T at absorption maximum λmax is up to 25%, and measuring an absorption spectrum of the sample. Referring to the absorption spectrum of FIG. 1, for example, a transmittance T at λmax and a transmittance $T_2$ which is substantially constant when the wavelength is shifted toward a longer wavelength side, that is, does not depend on a shift of wavelength are determined. The width αλ at one-half of the bottom depth measured from $T_2$ as a base to $T_1$ is the half band width. The dye film as the sample is generally about 50 to 150 nm thick.

It is noted that the above-mentioned values of n and k are determined in this way while setting the measurement wavelength at 650 nm and 780 nm.

Among such dyes, phthalocyanine dyes of formula (VI) are especially preferred.

Formula (VI) is described. In formula (VI), M is a center atom. Included in the center atom represented by M are a hydrogen atom (2H) or a metal atom. Examples of the metal atom used herein are those in Groups 1 to 14 of the Periodic Table (Groups 1A to 7A, 8, and 1B to 4B). For example, mention is made of Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn and Pb, more specifically, Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Cd, Hg, Al, In, Tl, Si, Ge, Sn, and Pb. Preferred among these are Al, Si, Ge, Sn, Cu, Pd, Ni, Fe, and Co, especially Cu, Pd, Ni, Fe, Co, and VO for aging stability.

It is understood that these metal atoms may take a form having oxygen coordinated thereto like V taking the form of VO. Alternatively, the metal atom may further have a ligand or ligands such as ether groups, ester groups, pyridine and derivatives thereof coordinated to the upper and/or lower sides or one lateral side, as in the case of Si, Al, Ge, Co, and Fe.

Each of $X_1$ to $X_4$ is a halogen atom, for example, F, Cl, Br, and I. Br and F are especially preferred.

Each of p1, p2, p3, and p4 is 0 or an integer of 1 to 4, and the sum of p1+p2+p3+p4 is 0 to 15, preferably 0 to 10.

$X_1$ to $X_4$ may be the same or different. Where each of p1, p2, p3, and p4 is an integer of 2 or more, $X_1$ groups, $X_2$ groups, $X_3$ groups or $X_4$ groups may be the same or different, respectively.

Each of $Y_1$ to $Y_4$ is an oxygen or sulfur atom, with the oxygen atom being especially preferred. $Y_1$ to $Y_4$ are generally the same though they may be different.

Each of $Z_1$ to $Z_4$ is an alkyl group, alicyclic hydrocarbon group, aromatic hydrocarbon group or heterocyclic group each having at least 4 carbon atoms, and they may be the same or different.

Each of q1, q2, q3, and q4 is 0 or an integer of 1 to 4, they are not equal to 0 at the same time, and the sum of q1+q2+q3+q4 is 1 to 8, preferably 2 to 6.

The position at which $Y_1$ to $Y_4$ are attached to the phthalocyanine ring is preferably the 3- and/or 6-position of the phthalocyanine ring (as seen from the structural formula shown below), and the inclusion of at least one such bond is preferred.

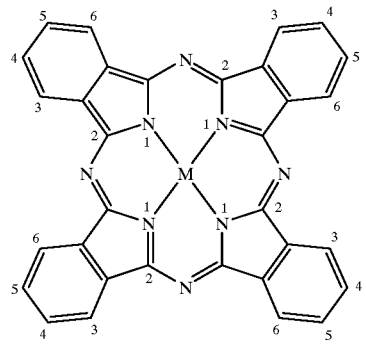

The alkyl groups represented by $Z_1$ to $Z_4$ are preferably those having 4 to 16 carbon atoms. These alkyl groups may be either normal or branched although the branched ones are preferred. The alkyl groups may have a substituent which is a halogen atom (such as F, Cl, Br, and I, especially F and Br), etc. Examples of the alkyl group include n-$C_4H_9$—, i-$C_4H_9$—, s-$C_4H_9$—, t-$C_4H_9$—, n-$C_5H_{11}$—, $(CH_3)_2CHCH_2CH_2$—, $(CH_3)_3CCH_3$—, $(C_2H_5)_2CH$—, $C_2H_5C(CH_3)_2$—, n-$C_3H_7CH(CH_3)$—, n-$C_6H_{13}$—, $(CH_3)_2CHCH_2CH_2CH_2$—, $(CH_3)_3C$—$CH_2$—$CH_2$—, n-$C_3H_7CH(CH_3)CH_2$—, n-$C_4H_9CH(CH_3)$—, n-$C_7H_{15}$—, [$(CH_3)_2CH$]$_2$—CH—, n-$C_4H_9CH(CH_3)CH_2$—, $(CH_3)_2CHCH_2CH(CH_3)CH_2$—, n-$C_8H_{17}$—, $(CH_3)_3CCH_2CH(CH_3)CH_2$—, $(CH_3)_2CHCH$ (i-$C_4H_9$)—, n-$C_4H_9CH(C_2H_5)CH_2$—, n-$C_9H_{19}$—, $CH_3CH_2CH(CH_3)CH_2CH(CH_3)CH_2CH_2$—, $(CH_3)_2CHCH_2CH_2CH_2CH(CH_3)CH_2$—, n-$C_3H_7CH(CH_3)CH_2CH(CH_3)CH_2$—, n-$C_{10}H_{21}$—, $(CH_3)_3CCH_2CH_2C(CH_3)_2CH_2$—, n-$C_{11}H_{23}$—, n-$C_{12}H_{25}$—, n-$C_{13}H_{27}$—, n-$C_{14}H_{29}$—, n-$C_{15}H_{31}$—, n-$C_{16}H_{33}$—, n-$C_4F_9$—, i-$C_4F_9$—, s-$C_4F_9$—, and t-$C_4F_9$—.

The alicyclic hydrocarbon groups represented by $Z_1$ to $Z_4$ include cyclohexyl, cyclopentyl and other groups, with the cyclohexyl group being preferred. These groups may have a substituent which includes an alkyl group, aryl group, alkoxy group, aryloxy group, aralkyl group, halogen atom, nitro group, carboxyl group, ester group, acyl group, amino group, amide group, carbamoyl group, sulfonyl group, sulfamoyl group, sulfo group, sulfino group, arylazo group, alkylthio group, and arylthio group. Preferred substituents are alkyl groups having 1 to 5 carbon atoms (e.g., methyl, ethyl, n-propyl, iso-propyl, n-butyl, iso-butyl, sec-butyl, tert-butyl, n-pentyl, iso-pentyl, neo-pentyl, tert-pentyl, and 1-methylbutyl groups), alkoxy groups (e.g., methoxy, ethoxy, propoxy, isopropoxy, butoxy, isobutoxy, sec-butoxy, and tert-butoxy groups), aryl groups (e.g., phenyl, tolyl, biphenyl and naphthyl groups), and halogen atoms (e.g., F, Cl, Br, and I, with F and Br being preferred). The replacement position of these substituents is preferably either one or both of the positions adjacent to the position of attachment to each of $Y_1$ to $Y_4$. The inclusion of at least one such substitution is preferred.

The aromatic hydrocarbon groups represented by $Z_{1\ to\ Z4}$ may be monocyclic or have a fused ring and may have a substituent. The total number of carbon atoms is preferably 6 to 20. Examples are phenyl and naphthyl groups, with the phenyl group being preferred. They may have a substituent while examples and preferred examples of the substituent are the same as exemplified for the alicyclic hydrocarbon groups. The replacement position is also the same as previous, preferably ortho-position to the position of attachment to each of $Y_1$ to $Y_4$. The inclusion of at least one ortho-substitution is preferred.

The heterocyclic groups represented by $Z_1$ to $Z_4$ may be monocyclic or have a fused ring while the preferred heteroatom is oxygen, nitrogen, sulfur, etc., with oxygen and nitrogen being especially preferred. Exemplary groups include pyridyl, furanonyl, pyrazyl, pyrazolidyl, piperidinonyl, quinoxalyl, pyranonyl and thiophenetrionyl groups, with the pyridyl and 2-furanonyl groups being preferred. These heterocyclic groups may further have a substituent while examples and preferred examples of the substituent are the same as exemplified for the alicyclic hydrocarbon and aromatic hydrocarbon groups. Where there is a carbon atom adjacent to the position of attachment to each of $Y_1$ to $Y_4$, it is preferred to have a substituent at such an adjacent position.

Preferred for $Z_1$ to $Z_4$ are alicyclic hydrocarbon and aromatic hydrocarbon groups, with cyclohexyl and phenyl groups being especially preferred, while it is preferred to have a substituent (especially the preferred substituents mentioned above) at one or both of the positions adjacent to the position of attachment to each of $Y_1$ to $Y_4$.

Illustrative examples of these phthalocyanine dyes are shown below although the invention is not limited thereto. These illustrative examples are shown in terms of $X_{11}$ to $X_{14}$, $X_{15}$ to $X_{18}$, $X_{19}$ to $X_{22}$, $X_{23}$ to $X_{26}$ and M in the following formula (VI-1). Where all of $X_{11}$ to $X_{14}$ etc. are hydrogen, it is shown by "H." Where any of $X_{11}$ to $X_{14}$ has a substituent, only the substituted one is shown, with the expression "H" being omitted. It is understood that the 3 and 6-positions and the 4 and 5-positions of the phthalocyanine ring are equivalent to each other and where a substituent is present at either one of these positions, only one is shown as a representative example.

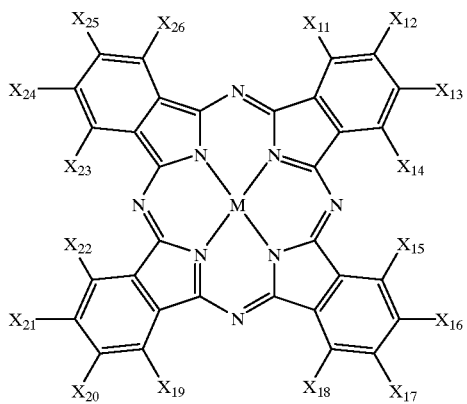

(VI-1)

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-1 | 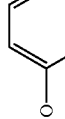 | 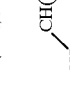 | 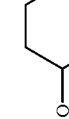 |  | Cu |
| A-2 |  | 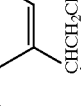 | 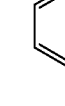 |  | Pd |
| A-3 |  |  |  |  | Cu |
| A-4 |  |  | 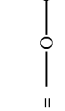 |  | Cu |
| A-5 |  |  |  |  | Cu |
| A-6 |  | 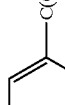 |  | 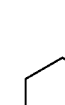 | Cu |

-continued
| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-7 | $X_{11}=$ 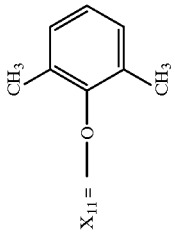 | $X_{15}=$ 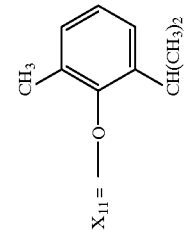 | $X_{19}=$ 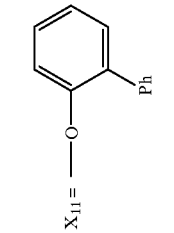 | $X_{23}=$ 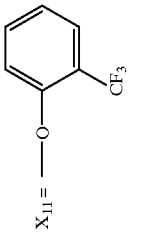 | Cu |
| A-8 | $X_{11}=$ 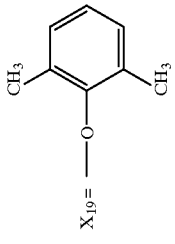 | $X_{15}=$ 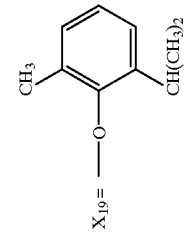 | $X_{19}=$ 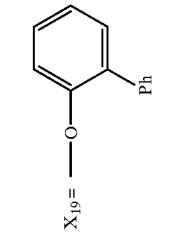 | $X_{23}=$ 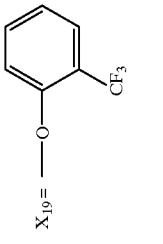 | Cu |
| A-9 | $X_{11}=$ 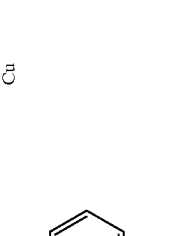 | $X_{15}=$ 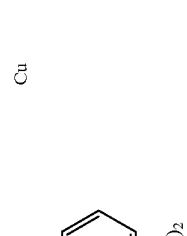 | $X_{19}=$ 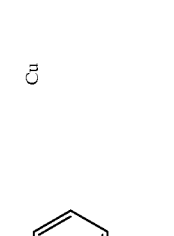 | $X_{23}=$ 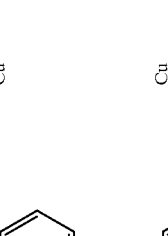 | Cu |
| A-10 | $X_{11}=$ 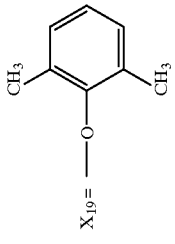 | $X_{15}=$ 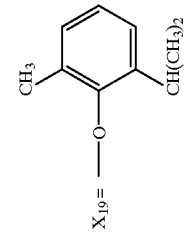 | $X_{19}=$ 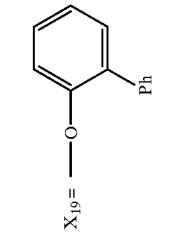 | $X_{23}=$ 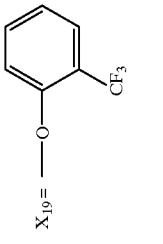 | Cu |
| A-11 | $X_{23}=$ 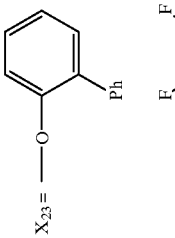 | $X_{15}=$ 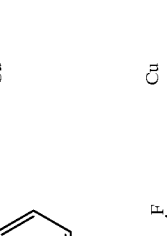 | $X_{19}=$ 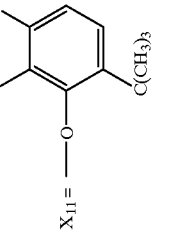 | $X_{23}=$  | Cu |
| A-12 | $X_{11}=$ 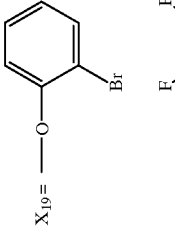 | $X_{15}=$ 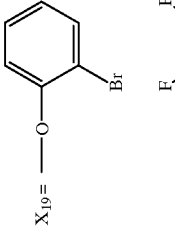 | $X_{19}=$ 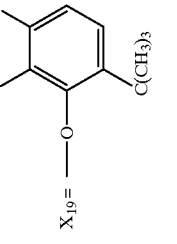 | $X_{23}=$ 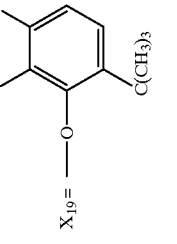 | Cu |

-continued
| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-13 | $X_{11}=$  | $X_{15}=$  | $X_{19}=$  | $X_{23}=$  | Cu |
| A-14 | $X_{12}=X_{13}=X_{14}=Br$ | $X_{16}=X_{17}=X_{18}=Br$ | $X_{20}=X_{21}=X_{22}=Br$ | $X_{24}=X_{25}=X_{26}=Br$ | Cu |
| A-14 | $X_{11}=$  | $X_{15}=X_{18}=$  | $X_{19}=X_{22}=$  | $X_{23}=X_{26}=$  | Cu |
| A-15 | $X_{12}=X_{13}=F$ | $X_{16}=X_{17}=F$ | $X_{20}=X_{21}=F$ | $X_{24}=X_{25}=F$ | Cu |
| A-15 | $X_{11}=$  | H | $X_{19}=$  | H | Cu |
| A-16 | $X_{11}=X_{14}=$  | H | $X_{19}=X_{22}=$  | $X_{23}=X_{26}=$  | Cu |
| A-17 | $X_{11}=X_{14}=$  | H | $X_{19}=X_{22}=$  | H | Cu |
| A-18 | $X_{11}=$  | $X_{15}=$  | $X_{19}=$ | $X_{23}=$ | Cu |

-continued

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-19 | $X_{11}=$ —O—(2-CH$_3$, 6-C(CH$_3$)$_3$-phenyl) | $X_{15}=$ —O—(2-CH$_3$, 6-C(CH$_3$)$_3$-phenyl) | $X_{19}=$ —O—(2-CH$_3$, 6-C(CH$_3$)$_3$-phenyl) | $X_{23}=$ —O—(2-CH$_3$, 6-C(CH$_3$)$_3$-phenyl) | Pd |
| A-20 | $X_{11}=$ —O—(2-CH$_3$, 6-C(CH$_3$)$_3$-phenyl) | $X_{15}=$ —O—(2-CH$_3$, 6-C(CH$_3$)$_3$-phenyl) | $X_{19}=$ —O—(2-CH$_3$, 6-C(CH$_3$)$_3$-phenyl) | $X_{23}=$ —O—(2-CH$_3$, 6-C(CH$_3$)$_3$-phenyl) | Ni |
| A-21 | $X_{11}=$ —O—(2-CH$_3$, 6-C(CH$_3$)$_3$-phenyl) | $X_{15}=$ —O—(2-CH$_3$, 6-C(CH$_3$)$_3$-phenyl) | $X_{19}=$ —O—(2-CH$_3$, 6-C(CH$_3$)$_3$-phenyl) | $X_{23}=$ —O—(2-CH$_3$, 6-C(CH$_3$)$_3$-phenyl) | Fe |
| A-22 | $X_{11}=$ —O—(2-CH$_3$, 6-C(CH$_3$)$_3$-phenyl) | $X_{15}=$ —O—(2-CH$_3$, 6-C(CH$_3$)$_3$-phenyl) | $X_{19}=$ —O—(2-CH$_3$, 6-C(CH$_3$)$_3$-phenyl) | $X_{23}=$ —O—(2-CH$_3$, 6-C(CH$_3$)$_3$-phenyl) | Co |
| A-23 | $X_{11}=$ —O—(2-CH$_3$, 6-C(CH$_3$)$_3$-phenyl) | $X_{15}=$ —O—(2-CH$_3$, 6-C(CH$_3$)$_3$-phenyl) | $X_{19}=$ —O—(2-CH$_3$, 6-C(CH$_3$)$_3$-phenyl) | $X_{23}=$ —O—(2-CH$_3$, 6-C(CH$_3$)$_3$-phenyl) | VO |

-continued

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-24 | $X_{11}=$ —O— (2,4-di-tert-butyl-cyclohexyl: C(CH$_3$)$_3$ at 4-position, C(CH$_3$)$_3$ at 2-position) | $X_{15}=$ —O— (2,4-di-tert-butyl-cyclohexyl) | $X_{19}=$ —O— (2,4-di-tert-butyl-cyclohexyl) | $X_{23}=$ —O— (2,4-di-tert-butyl-cyclohexyl) | Cu |
| A-25 | $X_{11}=$ —O— (2-(sec-butyl)cyclohexyl: CHCH$_2$CH$_3$/CH$_3$) | $X_{15}=$ —O— (2-(sec-butyl)cyclohexyl) | $X_{19}=$ —O— (2-(sec-butyl)cyclohexyl) | $X_{23}=$ —O— (2-(sec-butyl)cyclohexyl) | Cu |
| A-26 | $X_{11}=$ —O— (2-methylcyclohexyl: CH$_3$) | $X_{15}=$ —O— (2-methylcyclohexyl) | $X_{19}=$ —O— (2-methylcyclohexyl) | $X_{23}=$ —O— (2-methylcyclohexyl) | Cu |
| A-27 | $X_{11}=$ —O— (2,6-dimethylcyclohexyl: CH$_3$, CH$_3$) | $X_{15}=$ —O— (2,6-dimethylcyclohexyl) | $X_{19}=$ —O— (2,6-dimethylcyclohexyl) | $X_{23}=$ —O— (2,6-dimethylcyclohexyl) | Cu |
| A-28 | $X_{11}=$ —O— (2-methyl-6-isopropylcyclohexyl: CH$_3$, CH(CH$_3$)$_2$) | $X_{15}=$ —O— (2-methyl-6-isopropylcyclohexyl) | $X_{19}=$ —O— (2-methyl-6-isopropylcyclohexyl) | $X_{23}=$ —O— (2-methyl-6-isopropylcyclohexyl) | Cu |
| A-29 | $X_{11}=$ —O— (2-phenylcyclohexyl: Ph) | $X_{15}=$ —O— (2-phenylcyclohexyl) | $X_{19}=$ —O— (2-phenylcyclohexyl) | $X_{23}=$ —O— (2-phenylcyclohexyl) | Cu |

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-30 | $X_{11}=$ —O— cyclohexyl-CF$_3$ | $X_{15}=$ —O— cyclohexyl-CF$_3$ | $X_{19}=$ —O— cyclohexyl-CF$_3$ | $X_{23}=$ —O— cyclohexyl-CF$_3$ | Cu |
| A-31 | $X_{11}=$ —O— cyclohexyl-Br | $X_{15}=$ —O— cyclohexyl-Br | $X_{19}=$ —O— cyclohexyl-Br | $X_{23}=$ —O— cyclohexyl-Br | Cu |
| A-32 | $X_{11}=$ —O— (F,F-cyclohexyl)-C(CH$_3$)$_3$ | $X_{15}=$ —O— (F,F-cyclohexyl)-C(CH$_3$)$_3$ | $X_{19}=$ —O— (F,F-cyclohexyl)-C(CH$_3$)$_3$ | $X_{23}=$ —O— (F,F-cyclohexyl)-C(CH$_3$)$_3$ | Cu |
| A-33 | $X_{11}=$ —O— cyclohexyl-C(CH$_3$)$_3$ | $X_{15}=$ —O— cyclohexyl-C(CH$_3$)$_3$ | $X_{19}=$ —O— cyclohexyl-C(CH$_3$)$_3$ | $X_{23}=$ —O— cyclohexyl-C(CH$_3$)$_3$ | Cu |
| A-34 | $X_{12}=X_{13}=X_{14}=$ Br $X_{11}=$ —O— cyclohexyl-Ph | $X_{16}=X_{17}=X_{18}=$ Br $X_{15}=$ —O— cyclohexyl-Ph | $X_{20}=X_{21}=X_{22}=$ Br $X_{19}=$ —O— cyclohexyl-Ph | $X_{24}=X_{25}=X_{26}=$ Br $X_{23}=$ —O— cyclohexyl-Ph | Cu |
|  | $X_{12}=X_{13}=$ F | $X_{16}=X_{17}=$ F | $X_{20}=X_{21}=$ F | $X_{24}=X_{25}=$ F |  |

-continued

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-35 | $X_{11}=$ —O—(2-C(CH$_3$)$_3$-cyclohexyl) | H | $X_{19}=$ —O—(2-C(CH$_3$)$_3$-cyclohexyl) | H | Cu |
| A-36 | $X_{11}=X_{14}=$ —O—(2-C(CH$_3$)$_3$-cyclohexyl) | H | $X_{19}=X_{22}=$ —O—(2-C(CH$_3$)$_3$-cyclohexyl) | $X_{23}=X_{26}=$ —O—(2-C(CH$_3$)$_3$-cyclohexyl) | Cu |
| A-37 | $X_{11}=X_{13}=$ —O—(2-C(CH$_3$)$_3$-cyclohexyl) | H | $X_{19}=X_{21}=$ —O—(2-C(CH$_3$)$_3$-cyclohexyl) | H | Cu |
| A-38 | $X_{11}=$ —S—(2-C(CH$_3$)$_3$-cyclohexyl) | $X_{15}=$ —S—(2-C(CH$_3$)$_3$-cyclohexyl) | $X_{19}=$ —S—(2-C(CH$_3$)$_3$-cyclohexyl) | $X_{23}=$ —S—(2-C(CH$_3$)$_3$-cyclohexyl) | Cu |
| A-39 | $X_{11}=$ —O—(2-CH$_3$-6-C(CH$_3$)$_3$-cyclohexyl) | $X_{15}=$ —O—(2-CH$_3$-6-C(CH$_3$)$_3$-cyclohexyl) | $X_{19}=$ —O—(2-CH$_3$-6-C(CH$_3$)$_3$-cyclohexyl) | $X_{23}=$ —O—(2-CH$_3$-6-C(CH$_3$)$_3$-cyclohexyl) | Pd |
| A-40 | $X_{11}=$ —O—(2-CH$_3$-6-C(CH$_3$)$_3$-cyclohexyl) | $X_{15}=$ —O—(2-CH$_3$-6-C(CH$_3$)$_3$-cyclohexyl) | $X_{19}=$ —O—(2-CH$_3$-6-C(CH$_3$)$_3$-cyclohexyl) | $X_{23}=$ —O—(2-CH$_3$-6-C(CH$_3$)$_3$-cyclohexyl) | Ni |

-continued

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-41 | $X_{11}$= 2-methyl-6-tert-butylphenoxy | $X_{15}$= 2-methyl-6-tert-butylphenoxy | $X_{19}$= 2-methyl-6-tert-butylphenoxy | $X_{23}$= 2-methyl-6-tert-butylphenoxy | Fe |
| A-42 | $X_{11}$= 2-methyl-6-tert-butylphenoxy | $X_{15}$= 2-methyl-6-tert-butylphenoxy | $X_{19}$= 2-methyl-6-tert-butylphenoxy | $X_{23}$= 2-methyl-6-tert-butylphenoxy | Co |
| A-43 | $X_{11}$= 2-methyl-6-tert-butylphenoxy | $X_{15}$= 2-methyl-6-tert-butylphenoxy | $X_{19}$= 2-methyl-6-tert-butylphenoxy | $X_{23}$= 2-methyl-6-tert-butylphenoxy | VO |
| A-44 | $X_{11}$= 2-tert-butylcyclohexyloxy | $X_{15}$= 2-methyl-6-tert-butylphenoxy | $X_{19}$= 2-tert-butylcyclohexyloxy | $X_{23}$= 2-methyl-6-tert-butylphenoxy | Cu |
| A-45 | $X_{11}$= 2-methyl-pyridin-3-yloxy | $X_{15}$= 2-methyl-pyridin-3-yloxy | $X_{19}$= 2-methyl-pyridin-3-yloxy | $X_{23}$= 2-methyl-pyridin-3-yloxy | Cu |

-continued

| Dye No. | $X_{11}\sim X_{14}$ | $X_{15}\sim X_{18}$ | $X_{19}\sim X_{22}$ | $X_{23}\sim X_{26}$ | M |
|---|---|---|---|---|---|
| A-46 | $X_{11}=$ [3-phenyl-4-oxy-2(5H)-furanone] | $X_{15}=$ [3-phenyl-4-oxy-2(5H)-furanone] | $X_{19}=$ [3-phenyl-4-oxy-2(5H)-furanone] | $X_{23}=$ [3-phenyl-4-oxy-2(5H)-furanone] | Cu |
| A-47 | $X_{11}=$ —OCHCH(CH$_3$)$_2$ / CH$_2$CH(CH$_3$)$_2$ | $X_{15}=$ —OCHCH(CH$_3$)$_2$ / CH$_2$CH(CH$_3$)$_2$ | $X_{19}=$ —OCHCH(CH$_3$)$_2$ / CH$_2$CH(CH$_3$)$_2$ | $X_{23}=$ —OCHCH(CH$_3$)$_2$ / CH$_2$CH(CH$_3$)$_2$ | Cu |
| A-48 | $X_{11}=$ —OCH$_2$CHC$_4$H$_9$ / C$_2$H$_5$ | $X_{15}=$ —OCH$_2$CHC$_4$H$_9$ / C$_2$H$_5$ | $X_{19}=$ —OCH$_2$CHC$_4$H$_9$ / C$_2$H$_5$ | $X_{23}=$ —OCH$_2$CHC$_4$H$_9$ / C$_2$H$_5$ | Cu |
| A-49 | $X_{11}=$ —OCHCH(CH$_3$)$_2$ / CH$_3$ | $X_{15}=$ —OCHCH(CH$_3$)$_2$ / CH$_3$ | $X_{19}=$ —OCHCH(CH$_3$)$_2$ / CH$_3$ | $X_{23}=$ —OCHCH(CH$_3$)$_2$ / CH$_3$ | Ni |
| A-50 | $X_{11}=$ —OCHCH(CH$_3$)$_2$ / CH$_2$CH(CH$_3$)$_2$ | $X_{15}=$ —OCHCH(CH$_3$)$_2$ / CH$_2$CH(CH$_3$)$_2$ | $X_{19}=$ —OCH$_2$CHC$_4$H$_9$ / C$_2$H$_5$ | $X_{23}=$ —OCH$_2$CHC$_4$H$_9$ / C$_2$H$_5$ | Cu |
| A-51 | $X_{11}=$ —O—[2-(tert-butyl)phenyl], C(CH$_3$)$_3$ | $X_{15}=$ —O—[2-(tert-butyl)phenyl], C(CH$_3$)$_3$ | $X_{19}=$ —O—[2-(tert-butyl)phenyl], C(CH$_3$)$_3$ | $X_{23}=$ —O—[2-(tert-butyl)phenyl], C(CH$_3$)$_3$ | Co |

The aforementioned phthalocyanine dyes may be synthesized in the light of methods as disclosed in JP-A 313760/1988, JP-A 301261/1988, EP 675489, etc.

These dyes have a melting point (mp) of 60 to 400° C.

These phthalocyanine dyes have n and k at 780 nm as reported in Tables 4 and 5. These values of n and k were determined using a dye film of 80 nm thick. The half band width of an absorption spectrum of a dye thin film was also determined as mentioned above, with the results being reported together with λmax (thin film).

TABLE 4

| Dye No. | n (780 nm) | k | λmax, nm | Half band width, nm (absorption spectrum) |
|---|---|---|---|---|
| A-1 | 2.2 | 0.08 | 724 | 130 |
| A-2 | 2.3 | 0.05 | 715 | 140 |
| A-3 | 2.4 | 0.10 | 725 | 125 |
| A-4 | 2.3 | 0.10 | 724 | 130 |
| A-5 | 2.3 | 0.11 | 724 | 125 |
| A-6 | 2.4 | 0.10 | 725 | 130 |
| A-7 | 2.3 | 0.09 | 723 | 120 |
| A-8 | 2.2 | 0.10 | 725 | 140 |
| A-9 | 2.2 | 0.10 | 723 | 120 |
| A-10 | 2.3 | 0.11 | 723 | 130 |
| A-11 | 2.2 | 0.11 | 723 | 125 |
| A-12 | 2.1 | 0.10 | 726 | 125 |
| A-13 | 2.2 | 0.10 | 727 | 125 |
| A-14 | 2.2 | 0.10 | 725 | 125 |
| A-15 | 2.2 | 0.11 | 723 | 130 |
| A-16 | 2.3 | 0.12 | 725 | 130 |
| A-17 | 2.3 | 0.10 | 723 | 125 |
| A-18 | 2.3 | 0.09 | 725 | 125 |
| A-19 | 2.2 | 0.05 | 715 | 130 |
| A-20 | 2.2 | 0.08 | 720 | 130 |
| A-21 | 2.2 | 0.07 | 718 | 135 |
| A-22 | 2.2 | 0.08 | 720 | 140 |
| A-23 | 2.2 | 0.13 | 730 | 120 |
| A-24 | 2.2 | 0.11 | 725 | 125 |
| A-25 | 2.2 | 0.10 | 726 | 125 |

TABLE 5

| Dye No. | n (780 nm) | k | λmax, nm | Half band width, nm (absorption spectrum) |
|---|---|---|---|---|
| A-26 | 2.3 | 0.09 | 725 | 130 |
| A-27 | 2.3 | 0.09 | 720 | 135 |
| A-28 | 2.4 | 0.09 | 725 | 130 |
| A-29 | 2.3 | 0.10 | 720 | 125 |
| A-30 | 2.4 | 0.11 | 723 | 125 |
| A-31 | 2.3 | 0.10 | 721 | 125 |
| A-32 | 2.2 | 0.11 | 722 | 130 |
| A-33 | 2.3 | 0.10 | 724 | 125 |
| A-34 | 2.4 | 0.10 | 725 | 130 |
| A-35 | 2.4 | 0.10 | 721 | 125 |
| A-36 | 2.4 | 0.10 | 722 | 135 |
| A-37 | 2.3 | 0.09 | 725 | 140 |
| A-38 | 2.3 | 0.09 | 725 | 135 |
| A-39 | 2.3 | 0.07 | 715 | 135 |
| A-40 | 2.3 | 0.08 | 720 | 135 |
| A-41 | 2.3 | 0.08 | 720 | 125 |
| A-42 | 2.3 | 0.08 | 720 | 135 |
| A-43 | 2.2 | 0.09 | 728 | 140 |
| A-44 | 2.2 | 0.09 | 728 | 140 |
| A-45 | 2.2 | 0.09 | 726 | 135 |
| A-46 | 2.2 | 0.10 | 727 | 140 |
| A-47 | 2.2 | 0.09 | 723 | 130 |
| A-48 | 2.2 | 0.10 | 725 | 135 |
| A-49 | 2.3 | 0.08 | 718 | 140 |
| A-50 | 2.2 | 0.10 | 726 | 125 |
| A-51 | 2.1 | 0.07 | 718 | 130 |

It is noted that these dyes may be used alone or in admixture of two or more.

The coating solvent used in the practice of the invention may be selected from alcohol solvents (including keto-alcohols and alkoxyalcohols such as ethylene glycol monoalkyl ethers), aliphatic hydrocarbon solvents, ketone solvents, ester solvents, ether solvents, aromatic solvents, halogenated alkyl solvents, etc.

Preferred among these are alcohol and aliphatic hydrocarbon solvents. Preferable alcohol solvents are alkoxy-alcohols and keto-alcohols. In the preferred alkoxy-alcohols, the alkoxy moiety has 1 to 4 carbon atoms, the alcohol moiety has 1 to 5 carbon atoms, especially 2 to 5, and the total number of carbon atoms is 3 to 7. Examples include ethylene glycol monomethyl ether (methyl cellosolve), ethylene glycol monoethyl ether (ethyl cellosolve also known as ethoxyethanol), butyl cellosolve, ethylene glycol monoalkyl ethers (cellosolves) such as 2-isopropoxy-1-ethanol, 1-methoxy-2-propanol, 1-methoxy-2-butanol, 3-methoxy-1-butanol, 4-methoxy-1-butanol, and 1-ethoxy-2-propanol. An exemplary keto-alcohol is diacetone alcohol. Fluorinated alcohols such as 2,2,3,3-tetrafluoropropanol are also useful.

Preferred for the aliphatic hydrocarbon solvents are n-hexane, cyclohexane, methylcyclohexane, ethylcyclohexane, cyclooctane, dimethylcyclohexane, n-octane, iso-propylcyclo-hexane and t-butylcyclohexane, among which ethylcyclohexane and dimethylcyclohexane are most preferable.

Cyclohexanone is typical of the ketone solvent.

In the practice of the invention, alkoxyalcohols such as ethylene glycol monoalkyl ethers are preferred. Preferred among these are ethylene glycol monoethyl ether, 1-methoxy-2-propanol, 1-methoxy-2-butanol, etc. Also preferred is a mixture of these solvents, for example, a combination of ethylene glycol monoethyl ether and 1-methoxy-2-butanol. Fluorinated alcohols are also preferable.

It is understood that the azo metal complex according to the invention and the dye combined therewith such as a phthalocyanine dye are respectively used as a mixture of two or more so as to meet the above-mentioned values of n and k.

When a recording layer of an optical recording medium intended for recording and reading at two wavelengths is formed of a mixture of two or more dyes, the azo metal complex according to the invention and the other dye as typified by a phthalocyanine dye are preferably mixed such that the molar ratio of inventive azo metal complex/other dye may range from 90/10 to 10/90.

A recording layer of the mix type mentioned just above may be formed using a coating solution containing the two dyes in a predetermined ratio.

Also acceptable for the purpose of recording and reading at two wavelengths is a recording layer in which a layer of the azo metal complex according to the invention and a layer of the other dye are disposed one on top of the other. The order of lamination may be suitably chosen while one layer usually has a thickness of about 20 to 250 nm. A recording layer of the laminate type may be formed using coating solutions containing the respective dyes.

In the two layer structure using a recording layer of the laminate type, it is preferred that a lower recording layer (or first recording layer) containing an azo metal complex accommodating for short wavelength be disposed on a substrate and an upper recording layer (or second recording layer) containing a phthalocyanine dye of formula (VI)

accommodating for 780 nm be disposed thereon. It is preferred herein that the lower recording layer is thinner than the upper recording layer and that the lower and upper recording layers are formed such that the thickness ratio of lower layer/upper layer may range from 1/10 to 1/1.

Figure 2:
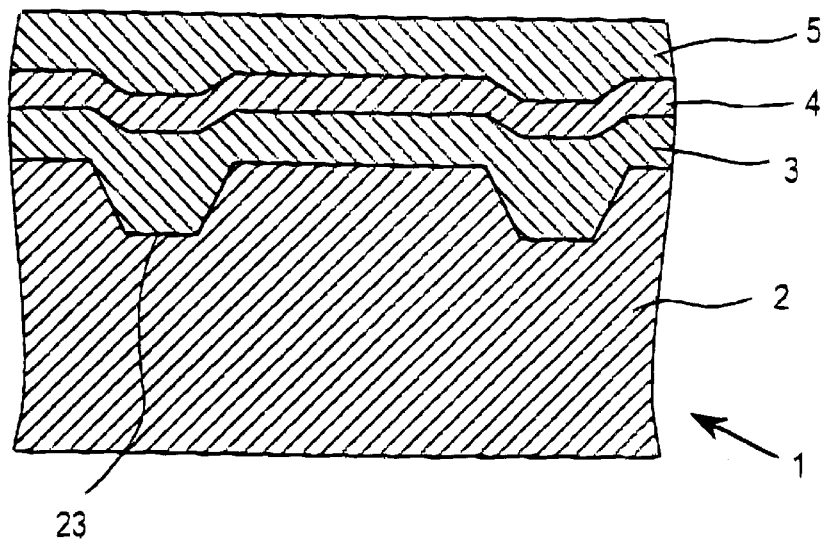
FIG. 2 is a fragmental cross-sectional view of an optical disc according to one embodiment of the invention.

One structural embodiment of the optical recording disc having such a recording layer accommodating for two wavelengths or a short wavelength on a substrate is illustrated in FIG. 2. FIG. 2 is a fragmental sectional view. The optical recording disc 1 shown in FIG. 2 is a close contact type optical recording disc which has a recording layer and a reflective layer disposed in close contact therewith and enables reading according to the CD standard. As illustrated, the optical recording disc 1 includes a recording layer 3 containing a dye in the form of an azo metal complex compound according to the invention, which is formed on the surface of a substrate 2, a reflective layer 4 in close contact with the recording layer 3, and a protective film 5.

The recording layer 3 may be of the two wavelength accommodating mode including the mix type and the laminate type, of the short wavelength accommodating mode using an azo metal complex as a major component, or of the conventional wavelength accommodating mode.

The substrate 2 is in a disc form and, to enable write and read from the back surface of the substrate 2, is preferably formed of a resin or glass material which is substantially transparent (and preferably has a transmittance of at least 88%) to writing and reading light (typically laser light having a wavelength of about 500 nm to about 900 nm, further typically about 500 to about 700 nm, still further typically about 630 to about 690 nm, most typically about 635 nm to about 680 nm, laser light having a wavelength of about 680 to about 900 nm, and semiconductor laser light having a wavelength of about 770 nm to about 900 nm, further typically about 770 to 830 nm; especially 650 nm and 780 nm). With respect to dimensions, the disc has a diameter of about 64 mm to about 200 mm and a thickness of about 1.2 mm.

On the surface of the substrate 2 where the recording layer 3 is formed, a groove 23 is formed for tracking purposes, as shown in FIG. 2. The groove 23 is preferably a continuous spiral groove having a depth of 0.1 to 0.25 μm, a width of 0.35 to 0.60 μm for the mix type, the short wavelength accommodating mode and the conventional wavelength accommodating mode and 0.35 to 0.80 μm for the laminate type and a groove pitch of 1.5 to 1.7 μm. Such groove configuration enables good-enough tracking signals to be obtained without a lowering of the reflection level of the groove area. It is particularly important to limit the groove width to 0.35 to 0.80 μm or 0.35 to 0.60 μm. A groove width of less than 0.35 μm makes it difficult to obtain tracking signals of sufficient magnitude, resulting in an increased jitter even when tracking is slightly offset during recording. A too greater groove width has a likelihood that read signals are subject to waveform distortion.

The substrate 2 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 23 should be formed simultaneously with the molding of the substrate 2. Alternatively, a resin layer having the groove 23 may be formed by 2P or other methods after the fabrication of the substrate 2. Also, a glass substrate is useful as the case may be.

As shown in FIG. 2, the recording layer 3 deposited on the substrate 2 is formed using the above-mentioned dye-containing coating solution, preferably by spin coating as mentioned previously. Spin coating may be carried out from the inner to the outer periphery under conventional conditions while the number of revolutions is adjusted between 500 rpm and 5,000 rpm.

Preferably, the thus formed recording layer 3 has an as-dried thickness of 500 to 3,000 Å (50 to 300 nm) for the mix type, the short wavelength accommodating mode and the conventional wavelength accommodating mode. A departure from this range gives rise to a reflectance drop, rendering it difficult to read according to the CD standard. A very high degree of modulation is obtained when the thickness of the tracking area of the recording layer 3 within the groove 23 is kept at 1,000 Å (100 nm) or more, especially, at 1,300 to 3,000 Å (130 to 300 nm).

For the laminate type, each recording layer preferably has an as-dried thickness of 200 to 2,500 Å (20 to 250 nm) as previously mentioned because better reading is expectable. Also preferably the thickness of the tracking area of the recording layer 3 within the groove 23 is kept at 500 Å (50 nm) or more, especially, at 500 to 800 Å (50 to 80 nm). Further, in the embodiment of the two layer structure having the azo metal complex dye according to the invention contained in the lower layer as previously mentioned, better recording and reading at 780 nm is expectable in the CD-RII mode by controlling the thickness of the upper and lower layers as mentioned above.

The thus formed recording layer 3 should preferably have $n=1.8$ to 2.3 and $k=0.02$ to 0.20 at 650 nm and $n=1.8$ to 2.6 and $k=0.02$ to 0.30 at 780 nm when it is a recording layer of the dye mix type accommodating for two wavelengths. The recording layer 3 should preferably have $n=1.8$ to 2.6 and $k=0.02$ to 0.20 at 650 nm and $n=1.8$ to 2.6 and $k=0.02$ to 0.15 at 780 nm when it is a recording layer of the laminate type accommodating for two wavelengths. By controlling n and k within these ranges, better recording and reading at two wavelengths is possible. Especially at the conventional wavelength of about 780 nm, recording and reading complying with the Orange Book standard is possible.

In the mode accommodating for a short wavelength of about 650 nm or a conventional wavelength of about 780 nm, the recording layer should preferably have a coefficient of extinction k (imaginary part of a complex index of refraction) of 0 to 0.20 at the wavelengths of recording light and reading light. With k greater than 0.20, no satisfactory reflectance is obtained. Further, the recording layer should preferably have an index of refraction n (real part of a complex index of refraction) of at least 1.8. With n less than 1.8, signal modulation would be too small. No upper limit is imposed on n although it is usually about 2.6 for convenience of synthesis of dye compounds and other reasons.

It is noted that n and k of a recording layer are determined by preparing a test sample in which a recording layer is formed on a given transparent substrate to a thickness of about 40 to 100 nm, for example, under practical conditions, and measuring the test sample for reflectance through the substrate or on the recording layer side. The reflectance is measured in a specular reflection mode (of the order of 5°) using the wavelength of recording light and reading light. The sample is also measured for transmittance. From these measurements, n and k are calculated according to ISHIGURO Kozo, "Optics," Kyoritsu Publishing K.K., pages 168–178, for example.

It is understood that a recording layer has n and k which correspond to n and k of a particular dye used therein.

As shown in FIG. 2, the reflective layer 4 is formed on the recording layer 3 in direct contact relation thereto. Preferably, the reflective layer 4 is formed of a high-reflectance metal or alloy such as Au, Cu, Al, Ag and AgCu. The reflective layer 4 preferably has a thickness of at least 500 Å, and may be formed as by evaporation and sputtering. The upper limit of thickness is not critical, although it is preferably about 1,200 Å or less when cost, production time and other factors are taken into account. Then the reflective layer itself has a reflectance of at least 90%, and the reflectance of an unrecorded area of the medium through the substrate is satisfactory and can be at least 60%, especially at least 70% at the conventional wavelength of about 780 nm in the case of the two wavelength accommodating mode.

As shown in FIG. 2, the protective layer 5 is formed on the reflective layer 4. The protective layer 5 is formed of various resin materials such as UV-curable resins, for instance, and usually has a thickness of about 0.5 μm to about 100 μm. The protective layer 5 may be in a layer or sheet form. The protective layer 5 may be formed by conventional processes such as spin coating, gravure coating, spray coating and dipping.

Recording or additional writing may be carried out on the optical recording disc 1 of such construction by directing recording light having a wavelength of 650 nm or 780 nm, for example, in pulse form to the recording layer 3 through the substrate 2 to form an irradiated spot where optical reflectance is changed. Upon irradiation of recording light, the recording layer 3 absorbs light so that it is heated while the substrate 2 is heated at the same time. As a result, the materials of the recording layer such as the dyes melt or decompose in the vicinity of the interface between the substrate 2 and the recording layer 3, probably applying pressure to that interface to deform the bottom and side walls of the groove.

Figure 3:
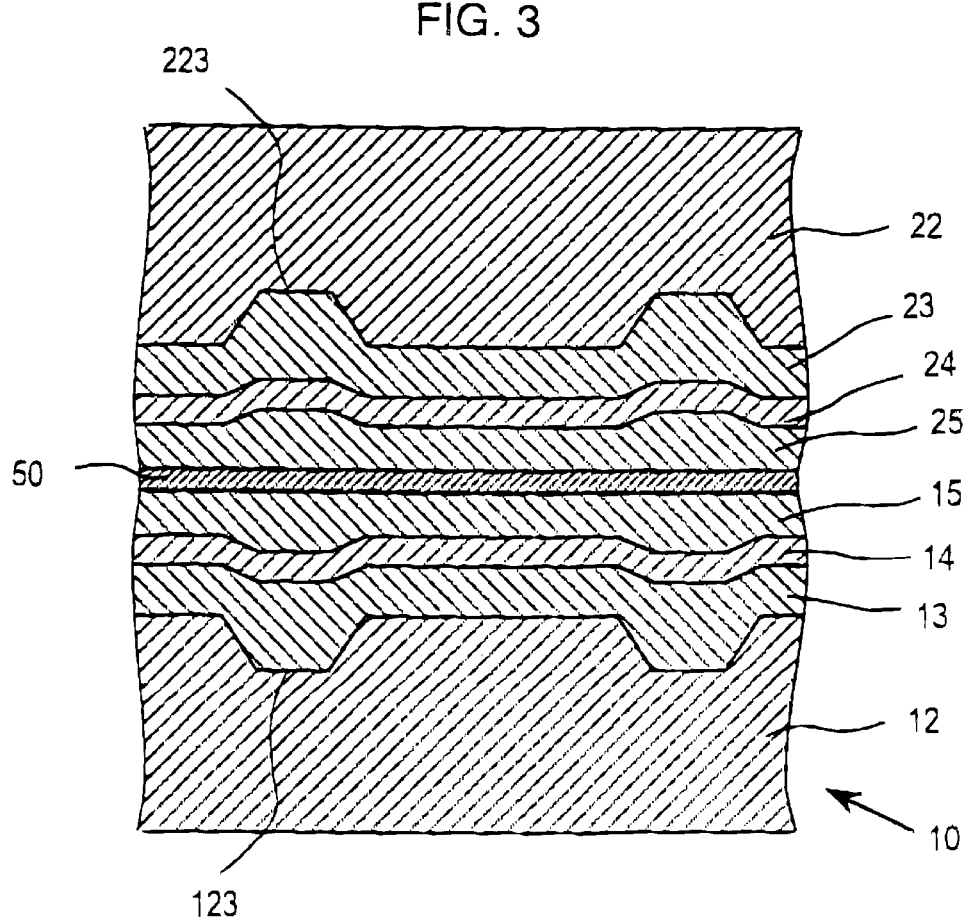
FIG. 3 is a fragmental cross-sectional view of an optical disc according to another embodiment of the invention.

The azo metal complex compounds according to the invention may also be used in the recording layer of write-once digital video discs (DVD-R) adapted to carry out recording and reading at a short wavelength of about 635 nm One exemplary construction of the disc is shown in FIG. 3. FIG. 3 is a fragmental sectional view.

The optical recording disc 10 shown in FIG. 3 is an optical recording disc complying with the DVD standard, which is obtained by adhesively joining two discs of the same structure as the optical recording disc 1, with their protective films 15 and 25 faced each other. The adhesive used herein may be a thermosetting resin or the like, and an adhesive layer 50 has a thickness of about 10 to 200 μm. The substrates (which are generally formed of a polycarbonate resin) each have a thickness of 0.6 mm. On one substrate 12 having a groove 123 formed therein, a recording layer 13, a reflective layer 14 and a protective film 15 as in FIG. 2 are successively formed. On another substrate 22 having a groove 223 formed therein, a recording layer 23, a reflective layer 24 and a protective film 25 are similarly formed. They are then joined together as mentioned above.

The substrates accord with the above-described one for CD, and their groove has a depth of 600 to 2,000 Å, a width of 0.2 to 0.5 μm, and a pitch of 0.6 to 1.0 μm.

The recording layer has a thickness of 500 to 3,000 Å and its complex index of refraction at 635 nm consists of n=1.8 to 2.6 and k=0.02 to 0.20.

EXAMPLE

Examples of the invention are given below, together with Comparative Examples, by way of illustration.

Example 1

A salt-forming dye: Compound D-1 was used as a dye to form an optical recording layer. On a polycarbonate resin substrate of 120 mm in diameter and 1.2 mm thick having a pregroove (depth 0.16 μm, width 0.45 μm, and groove pitch 1.6 μm), a recording layer containing the dye was formed to a thickness of 1,800 Å (180 nm) by spin coating. The coating solution used herein was a 1.0 wt % 2,2,3,3-tetrafluoropropanol solution. Next, a reflective layer of Au was formed on the recording layer to a thickness of 850 Å by sputtering, and a transparent protective film of a UV-curable acrylic resin (5 μm thick) was formed thereon, fabricating a disc (see FIG. 2).

Using a laser having an oscillation wavelength of 780 nm, signals were recorded and read from the thus fabricated optical recording disc sample No. 101 at a linear velocity of 1.2 m/s for evaluating optimum recording power (Po), reflectance, modulation, and jitter. These measurements satisfied the Orange Book standard.

Further the sample was examined for light resistance. Light resistance was examined by exposing the sample to a xenon lamp at 80,000 lux (Xenon Fadeometer manufactured by Shimazu Mfg. K.K.) for 40 hours, and measuring the jitter of the disc. The jitter remained unchanged. A reliability test was carried out under conditions of 80° C. and RH 80% for 100 hours, finding no deterioration.

Samples were fabricated as sample No. 101 except that salt-forming dyes: Compounds D-2 to D-20 were used as the recording layer dye instead of the salt-forming dye: Compound D-1. These samples are designated sample Nos. 102 to 120. Using a mixture of D-4 and D-12, sample No. 121 was also fabricated. As a result, these samples also showed satisfactory properties.

Of the salt-forming dye compounds, those compounds having indolenine cyanine dye ions as the counterion allows a choice of solvent from a wider range in preparing the coating solution as compared with the thiazoline and oxazoline systems. Coating solutions could be readily prepared using cellosolve solvents such as ethyl cellosolve.

Example 2

An optical recording disc was fabricated using an azo metal complex: Compound 1 as a dye to form a recording layer. On a polycarbonate resin substrate of 120 mm in diameter and 0.6 mm thick having a pregroove (depth 0.10 μm, width 0.42 μm, and groove pitch 0.74 or 0.8 μm), a recording layer containing the dye was formed to a thickness of 1,300 Å (130 nm) by spin coating. The coating solution used herein was a 1.0 wt % 2,2,3,3-tetrafluoropropanol solution. Next, a reflective layer of Au thick was formed on the recording layer to a thickness of 850 Å by sputtering, and a transparent protective film (5 μm thick) of a UV-curable acrylic resin was formed thereon. Two disc samples formed in this way were mated such that the protective films were joined with adhesive, obtaining a disc (see FIG. 3).

This is designated sample No. 201.

Samples we re fabricated as sample No. 201 except that Compounds 3, 4, 6, 9 to 17, 21, 22, C-1, C-2, C-5 to C-12, and C-16 to C-31 as shown in Table 7 were used as the recording layer dye instead of Compound 1. These samples are designated sample Nos. 202 to 241.

The thus fabricated sample Nos. 201 to 241 were examined for various characteristics by recording signals at a linear velocity of 3.8 m/s with a laser beam of 635 nm and then reading the signals at a linear velocity of 3.8 m/s with a laser beam of 635 nm. The lens had a numerical aperture (NA) of 0.60. The characteristics examined included reflectance, modulation (Mod.), jitter, and optimum recording power (Po).

The results are shown in Tables 6 and 7.

TABLE 6

| Sample No. | Recording layer dye | Reflectance (%) | Mod. (%) | Jitter (%:σ/Tw) | P0 (mW) |
|---|---|---|---|---|---|
| 201 | Compound 1 | 58 | 70 | 8 | 8.2 |
| 202 | Compound 3 | 57 | 64 | 8 | 8.3 |
| 203 | Compound 4 | 56 | 63 | 8 | 8.3 |
| 204 | Compound 6 | 50 | 55 | 8.7 | 9.0 |
| 205 | Compound 9 | 51 | 60 | 8.3 | 8.3 |
| 206 | Compound 10 | 50 | 55 | 8.7 | 8.8 |
| 207 | Compound 11 | 50 | 57 | 9.0 | 8.8 |
| 208 | Compound 12 | 57 | 68 | 9.0 | 11.0 |
| 209 | Compound 13 | 57 | 69 | 9.0 | 11.0 |
| 210 | Compound 14 | 63 | 70 | 9.3 | 11.3 |
| 211 | Compound 15 | 62 | 71 | 9.0 | 11.5 |
| 212 | Compound 16 | 50 | 56 | 9.2 | 11.2 |
| 213 | Compound 17 | 55 | 64 | 9.2 | 11.3 |
| 214 | Compound 21 | 56 | 55 | 8 | 8.3 |
| 215 | Compound 22 | 55 | 66 | 7.8 | 8.4 |
| 216 | Compound C-1 | 50 | 55 | 8.3 | 8.5 |
| 217 | Compound C-2 | 56 | 57 | 8.7 | 9.0 |
| 218 | Compound C-5 | 57 | 68 | 8.2 | 8.5 |
| 219 | Compound C-6 | 60 | 70 | 8.0 | 8.2 |
| 220 | Compound C-7 | 61 | 62 | 7.8 | 8.3 |
| 221 | Compound C-8 | 55 | 63 | 7.6 | 8.4 |
| 222 | Compound C-9 | 55 | 63 | 7.7 | 8.5 |
| 223 | Compound C-10 | 50 | 64 | 7.9 | 8.6 |

TABLE 7

| Sample No. | Recording layer dye | Reflectance (%) | Mod. (%) | Jitter (%:σ/Tw) | P0 (mW) |
|---|---|---|---|---|---|
| 224 | C-11 | 51 | 60 | 8.0 | 8.1 |
| 225 | C-12 | 52 | 62 | 7.8 | 8.3 |
| 226 | C-16 | 55 | 67 | 7.6 | 8.5 |
| 227 | C-17 | 53 | 64 | 8.1 | 8.0 |
| 228 | C-18 | 55 | 60 | 8.2 | 8.3 |
| 229 | C-19 | 59 | 55 | 8.6 | 9.0 |
| 230 | C-20 | 60 | 57 | 8.8 | 9.3 |
| 231 | C-21 | 54 | 60 | 7.5 | 9.0 |
| 232 | C-22 | 50 | 65 | 8.0 | 8.5 |
| 233 | C-23 | 53 | 65 | 7.8 | 7.8 |
| 234 | C-24 | 48 | 65 | 7.8 | 7.5 |
| 235 | C-25 | 46 | 60 | 8.0 | 7.2 |
| 236 | C-26 | 47 | 63 | 7.8 | 7.8 |
| 237 | C-27 | 47 | 60 | 8.5 | 7.9 |
| 238 | C-28 | 50 | 65 | 7.9 | 8.2 |
| 239 | C-29 | 53 | 65 | 8.0 | 8.1 |
| 240 | C-30 | 55 | 60 | 8.3 | 7.9 |
| 241 | C-31 | 58 | 58 | 8.3 | 9 |

It is evident from Tables 6 and 7 that the reflectance, modulation, and jitter are satisfactory.

It is evident that among the azo metal complexes according to the invention, discs using VO complexes of compounds of formula (V) show significantly improved characteristics.

Sample Nos. 201 to 241 were further examined for light resistance. Light resistance was examined by exposing the sample to a xenon lamp at 80,000 lux (Xenon Fadeometer manufactured by Shimazu Mfg. K.K.) for 40 hours, and measuring the jitter of the disc. For all the samples, the jitter remained unchanged.

A reliability test was carried out under conditions of 80° C. and RH 80% for 100 hours, finding no deterioration.

Of the salt-forming dye compounds, those compounds having indolenine cyanine dye ions as the counterion allows a choice of solvent from a wider range in preparing the coating solution as compared with the thiazoline and oxazoline systems. Coating solutions could be readily prepared using cellosolve solvents such as ethyl cellosolve.

Comparative Example 1

A disc sample was fabricated as in Example 1 except that the coating solution used contained a 1:1 mixture of Metal Complex B which was an intermediate in the synthesis of Compound D-1 in Synthesis Example 14 and a $ClO_4$ salt of Cyanine Dye B-39. Upon application, some crystals of Metal Complex B remained undissolved in the coating solution, and the filter was clogged. The tests on the thus fabricated sample showed insufficient light resistance and substantial deterioration of jitter. A reliability test also showed substantially deteriorated modulation and jitter.

Comparative Example 2

A disc sample was fabricated as in Example 2 except that the coating solution used contained a 1:1 mixture of Metal Complex A which was an intermediate in the synthesis of Compound C-24 in Synthesis Example 11 and a $ClO_4$ salt of Cyanine Dye B-9. Upon application, some crystals of Metal Complex A remained undissolved in the coating solution and the filter was clogged. The tests on the thus fabricated sample showed insufficient light resistance and substantial deterioration of modulation and jitter. In a reliability test, several parameters could not be measured because of the substantially deteriorated modulation.

Comparative Example 3

A disc sample was fabricated as in Example 1 using a bonded compound which was obtained by using a chromium family azo complex (a-1), shown below, disclosed in JP-B 51182/1991 and a heptamethine family cyanine dye (b-2), shown below, and bonding them in accordance with the method of JP-A 51182/1991. The sample was examined as in Example 1. The results could not meet the Orange Book standard.

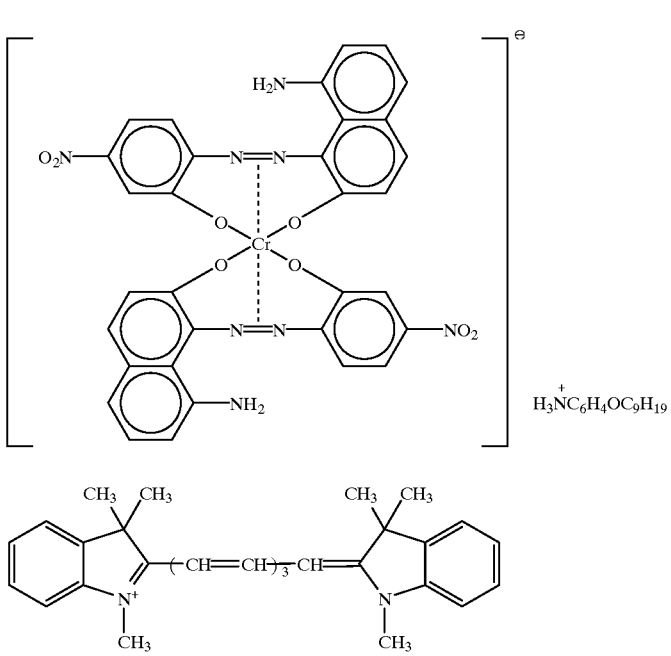

a-1 b-2

Using a sample having only the recording layer formed thereon, its absorption spectrum was measured. It showed absorption characteristics as shown in FIG. 2 of JP-A 51182/1991. The measurement of n and k at 780 nm gave n=2.40 and k=0.8, indicating a failure to provide satisfactory medium properties.

Example 3

A mixture of an azo metal complex: Compound 2 and Phthalocyanine Dye A-3 in a weight ratio of 1:1 was used as a dye to form an optical recording layer On an polycarbonate resin substrate of 120 mm in diameter and 1.2 mm thick having a pregroove (depth 0.14 μm, width 0.50 μm, and groove pitch 1.6 μm), a recording layer containing the dye was formed to a thickness of 2,000 Å (200 nm) by spin coating. The coating solution used herein was a 2 wt % 2-ethoxyethanol solution. Next, a reflective layer of Au was formed on the recording layer to a thickness of 850 Å by sputtering, and a transparent protective film of a UV-curable acrylic resin (5 μm thick) was formed thereon, fabricating a disc (see FIG. 2).

As previously described, Compound 2 had λmax of 620 nm as measured on a thin film sample of 50 nm thick, and its n and k at 650 nm as measured by the aforementioned method were n=2.35 and k=0.02.

Also as previously described, Dye A-3 had λmax of 725 nm as measured on a thin film sample of 80 nm thick, a half band width of 125 nm, n=2.4 and k=0.10.

The thus fabricated optical recording disc sample No. 401 was examined for optimum recording power (Po), reflectance, modulation, and jitter by recording signals at a linear velocity of 1.2 m/s using a laser having an oscillation wavelength of 780 nm and reading the signals using a laser having an oscillation wavelength of 780 nm and a laser having an oscillation wavelength of 650 nm. These results are shown below.
Examination with 780-nm laser
  optimum recording power 7.5 mW
  reflectance 70%
  modulation 63%
  jitter 22 ns
Examination with 650-nm laser
  reflectance 30%
  modulation 62%
  jitter 25 ns The sample was further examined for light resistance. Light resistance was examined by exposing the sample to a xenon lamp at 80,000 lux (Xenon Fadeometer manufactured by Shimazu Mfg. K.K.) for 40 hours, and measuring the jitter of the disc. The jitter remained unchanged.

Example 4

A disc sample No. 302 was fabricated as was sample No. 301 in Example 3 except that the azo metal complex: Compound 2 was replaced by Compound 5. It was similarly examined, with the results shown below.
Examination with 780-nm laser
  optimum recording power 7.5 mW
  reflectance 68%
  modulation 63%
  jitter 24 ns
Examination with 650-nm laser
  reflectance 30%
  modulation 62%
  jitter 25 ns The sample was further examined for light resistance. Light resistance was examined by exposing the sample to a xenon lamp at 80,000 lux (Xenon Fadeometer manufactured by Shimazu Mfg. K.K.) for 40 hours, and measuring the jitter of the disc. The jitter remained unchanged.

Example 5

Disc sample Nos. 303 to 317 were fabricated as was sample No. 301 in Example 3 except that the azo metal complex: Compound 2 was replaced by Compounds 1, 3, 7, 8, 18, 20, C-3, C-4, C-6, and C-13 to C-18. They were similarly examined. They showed satisfactory results equivalent to those of sample No. 301 in Example 4 and sample No. 302 in Example 5.

Example 6

An optical recording disc was fabricated as in Example 3 except that a recording layer of the lamination type was formed instead of the mix type.

A lower recording layer of 500 Å thick was formed on a substrate by applying a 0.8 wt % 2,2,3,3-tetrafluoropropanol solution of an azo metal complex: Compound 8 by spin coating, and drying at 60° C. for 3 hours.

An upper recording layer of 1,000 Å thick was formed on the lower recording layer by applying a 2.0 wt % ethylcyclohexane solution of Phthalocyanine Dye A-3 by spin coating, and drying at 60° C. for 3 hours.

On the recording layer of the two-layer structure, a reflective layer of Au was formed to a thickness of 850 Å by sputtering, and a UV-curable acrylic resin was coated thereon to a thickness of 5 $\mu$m as a protective film.

A disc sample No. 601 was fabricated in this way.

Disc sample No. 601 was examined as in Example 3, with the results shown below.

Examination with 780-nm laser optimum recording power 6.0 mW reflectance 68% modulation 65% jitter 22 ns

Examination with 650-nm laser reflectance 30% modulation 60% jitter 25 ns

Sample No. 601 was examined for light resistance as in Example 4. The jitter remained unchanged, indicating satisfactory light resistance.

Comparative Example 4

Using an azo cobalt dye of the type disclosed in JP-B 15682/1995, shown below, an optical recording disc was fabricated as in Example 2. The disc was examined for various characteristics. It showed a reflectance of 49%, a modulation of 60%, a jitter of 8.5% ($\sigma$/Tw), and an optimum recording power of 12.0 mW.

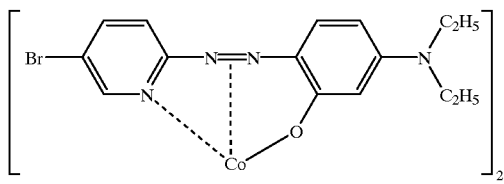

This sample showed apparently inferior characteristics to the sample of Example 2.

Comparative Example 5

Using a nickel complex of an azo compound of the type disclosed in JP-A 156408/1996, shown below, an optical recording disc was fabricated as in Example 2. The disc was examined for various characteristics. It showed a reflectance of 50%, a modulation of 48%, a jitter of 9.0% ($\sigma$/Tw), and an optimum recording power of 12.0 mW.

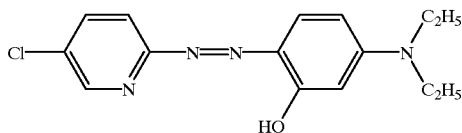

This sample showed apparently inferior characteristics to the sample of Example 2.

Example 7

An optical recording disc was fabricated using a mixture of an azo metal complex: Compound C-6 and a $ClO_4$ salt of Cyanine Dye B-11 in a weight ratio of 80:20 as a dye to form a recording layer.

On a polycarbonate resin substrate of 120 mm in diameter and 0.6 mm thick having a pregroove (depth 0.16 $\mu$m, width 0.30 $\mu$m, and groove pitch 0.8 $\mu$m), a recording layer containing the dyes was formed to a thickness of 100 nm by spin coating. The coating solution used herein was a 0.9 wt % 2,2,3,3-tetrafluoropropanol solution. Except these points, a disc was fabricated as in Example 2 (see FIG. 3).

This is designated disc sample No. 701. The thus fabricated sample was examined for recording characteristics as in Example 2.

For samples using different combinations of the azo metal complex with the cyanine dye (used as a $ClO_4$ salt in all samples), the type of dye and mixing ratio are shown in Table 8 together with the results of tests.

TABLE 8

| Sample No. | Azo metal complex | Cyanine dye | Mixing ratio | Reflectance (%) | Mod. (%) | Jitter (%, s/Tw) | Po (mW) |
| --- | --- | --- | --- | --- | --- | --- | --- |
| 701 | C-6 | B-11 | 80:20 | 55 | 61 | 8.5 | 10 |
| 702 | C-6 | B-1 | 80:20 | 51 | 60 | 8.8 | 10.2 |
| 703 | C-6 | B-2 | 90:10 | 50 | 61 | 8.7 | 10 |
| 704 | C-6 | B-5 | 80:20 | 53 | 62 | 8.7 | 10 |
| 705 | C-5 | B-5 | 80:20 | 51 | 61 | 8.8 | 10.3 |
| 706 | C-5 | B-7 | 90:10 | 48 | 60 | 8.5 | 10 |
| 707 | C-21 | B-8 | 80:20 | 52 | 63 | 8.5 | 10.5 |
| 708 | C-21 | B-10 | 80:20 | 55 | 60 | 8.4 | 10.3 |
| 709 | C-30 | B-8 | 80:20 | 51 | 62 | 8.1 | 10 |
| 710 | C-29 | B-13 | 80:20 | 48 | 61 | 8.8 | 10.2 |

It is evident from Table 8 that the reflectance, modulation and jitter are all satisfactory. As in Example 2, light resistance was examined and the reliability test was carried out. As a result, the jitter remained unchanged, indicating excellent light resistance. No deterioration occurred in the reliability test.

There has been described an optical recording medium using as the light absorbing dye an azo metal complex compound having improved solubility, light resistance and reliability and providing improved characteristics including a good balance of recording sensitivity, reflectance and modulation, a high recording sensitivity, and a minimal jitter.

Using an azo metal complex compound for the short wavelength operation in combination with a dye having absorption on a long wavelength side, an optical recording medium of the two wavelength accommodating type can be formed.

What is claimed is:

1. An optical recording medium comprising a recording layer containing an azo oxovanadium metal complex between an azo compound of the following formula (III) and oxovanadium;

A—N=N—B    (III)

wherein A is an aromatic ring group having an active hydrogen-bearing group at a position adjacent to the diazo group or a nitrogenous heteroaromatic ring group having therein an oxovanadium-coordinatable nitrogen atom at a position adjacent to the carbon atom in the ring attached to the diazo group; and B is an aromatic ring group having an active hydrogen-bearing group at a position adjacent to the diazo group.

2. The optical recording medium of claim 1 wherein A in formula (III) is an aromatic ring group having an active hydrogen-bearing group at a position adjacent to the diazo group.

3. The optical recording medium of claim 1 wherein said recording layer contains a second light-absorbing dye having different optical properties from said azo metal complex, and recording/reading operation is carried out with light having a first wavelength of 630 to 690 nm and light having a second wavelength of 770 to 830 nm.

4. The optical recording medium of claim 3 wherein recording is carried out with light having the second wavelength and reading is carried out with light having the first and second wavelengths.

5. The optical recording medium of claim 3 wherein said recording layer is disposed on a substrate, in which said azo metal complex has a complex index of refraction at 650 nm whose real part n is 1.8 to 2.6 and whose imaginary part k is 0.02 to 0.20, and said second light-absorbing dye has a complex index of refraction at 780 nm whose real part n is 1.8 to 2.6 and whose imaginary part k is 0.02 to 0.30 and forms a thin film whose absorption spectrum has a half band width of up to 170 nm.

6. The optical recording medium of claim 3 wherein said second light-absorbing dye is a phthalocyanine dye of the following formula (VI):

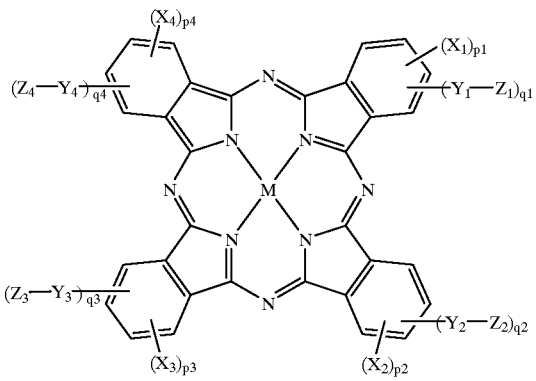

wherein M is a center atom; $X_1$, $X_2$, $X_3$ and $X_4$, which may be the same or different, are halogen atoms; p1, p2, p3 and p4 are 0 or integers of 1 to 4, p1+p2+p3+p4 is equal to 0 to 15; $Y_1$, $Y_2$, $Y_3$ and $Y_4$ which may be the same or different, are oxygen atoms or sulphur atoms: $Z_1$, $Z_2$, $Z_3$ and $Z_4$, which may be the same or different, are alkyl groups having at least 4 carbon atoms, alicyclic hydrocarbon groups, aromatic hydrocarbon groups or heterocyclic groups; q1, q2, q3 and q4 are 0 or integers of 1 to 4, they are not equal to 0 at the same time, and q1+q2+q3+q4 is equal to 1 to 8.

7. The optical recording medium of claim 1 wherein the recording layer is constructed of at least two layers by laying on a first recording layer containing said azo metal complex a second recording layer containing a second light-absorbing dye having different optical properties from said azo metal complex.

8. The optical recording medium of claim 7 wherein said azo metal complex has a complex index of refraction at 650 nm whose real part n is 1.8 to 2.6 and whose imaginary part k is 0.02 to 0.20, and said second light-absorbing dye has a complex index of refraction at 780 nm whose real part n is 1.8 to 2.6 and whose imaginary part k is 0.02 to 0.15 and forms a thin film whose absorption spectrum has a half band width of up to 170 nm, and the recording layer constructed of at least two layers is disposed on a substrate.

9. The optical recording medium of claim 7 wherein the first recording layer is disposed on the substrate, and the second recording layer is disposed on the first recording layer.

10. The optical recording medium of claim 9 wherein said first recording layer and said second recording layer each have a thickness of 20 to 250 nm, and the thickness of said first recording layer divided by the thickness of said second recording layer is from 0.1 to 1.

11. The optical recording medium of claim 1, wherein a counter cation is a cyanine cation according to formula (II) of claim 1.

12. An optical recording medium comprising a recording layer containing an azo metal complex obtained by combining at least one of an azo compound of the following formula (IV) and a compound of the following formula (V) with a metal compound;

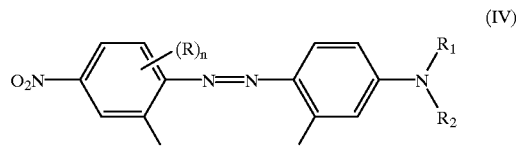

wherein X is an active hydrogen-bearing group, $R^1$ and $R^2$ each are an alkyl group, the total number of carbon atoms in $R^1$ and $R^2$ is from 2 to 8, R is a nitro group, and n is equal to 0 or 1.

13. The optical recording medium of claim 12 wherein said azo metal complex is a metal complex with oxovanadium or cobalt.

14. The optical recording medium of claim 7 wherein said azo metal complex is a metal complex of the compound of formula (V) with oxovanadium or cobalt.

15. The optical recording medium of claim 12, wherein a counter cation is a cyanine cation according to formula (II) of claim 1.

* * * * *

UNITED STATES PATENT AND TRADEMARK OFFICE
CERTIFICATE OF CORRECTION

PATENT NO. : 6,168,843 B1
DATED : January 2, 2001
INVENTOR(S) : Emiko Kambe et al.

It is certified that error appears in the above-identified patent and that said Letters Patent is hereby corrected as shown below:

Column 86,
Line 60, delete "7" and insert -- 12 --

Signed and Sealed this

Twenty-third Day of October, 2001

Attest:

*Nicholas P. Godici*

NICHOLAS P. GODICI
*Attesting Officer*   *Acting Director of the United States Patent and Trademark Office*